(12) United States Patent
Carnevali

(10) Patent No.: US 10,527,219 B2
(45) Date of Patent: Jan. 7, 2020

(54) MOUNTING TRACK FOR RETAINING A MOUNT ASSEMBLY

(71) Applicant: National Products, Inc., Seattle, WA (US)

(72) Inventor: Jeffrey D. Carnevali, Seattle, WA (US)

(73) Assignee: NATIONAL PRODUCTS, INC., Seattle, WA (US)

( * ) Notice: Subject to any disclaimer, the term of this patent is extended or adjusted under 35 U.S.C. 154(b) by 0 days.

(21) Appl. No.: 15/612,764

(22) Filed: Jun. 2, 2017

(65) Prior Publication Data
US 2018/0347749 A1    Dec. 6, 2018

(51) Int. Cl.
*F16M 11/20* (2006.01)
*F16M 13/02* (2006.01)

(52) U.S. Cl.
CPC ....... *F16M 11/2085* (2013.01); *F16M 13/022* (2013.01)

(58) Field of Classification Search
CPC .. F16M 13/022; F16M 11/2085; A61G 12/00; A61G 12/005; A61G 12/007; A61G 3/00; B60P 7/08; B60P 7/0815
USPC ..................... 248/224.7, 235, 243, 244, 250; 211/94.01, 94.02; 244/118.6; 108/55.1, 108/55.3, 55.5, 57.27
See application file for complete search history.

(56) References Cited

U.S. PATENT DOCUMENTS

| | | | |
|---|---|---|---|
| 180,881 A | 8/1876 | Howson | |
| 538,534 A | 4/1895 | Neill | |
| 596,729 A | 1/1898 | White | |
| 842,007 A | 1/1907 | Parker | |
| 855,149 A | 5/1907 | Vaughn et al. | |
| 890,656 A | 6/1908 | Johnson | |
| 892,105 A | 6/1908 | White | |
| 958,052 A | 5/1910 | Williams | |
| 1,009,913 A | 11/1911 | Maguire et al. | |
| 1,280,013 A | 9/1918 | Goddard | |
| 1,359,645 A | 11/1920 | Zink | |

(Continued)

OTHER PUBLICATIONS

Yakattack.us, 7 pages of product description of GearTrac retrieved from web site at: www.yakattack.us/by-product-name/geartrac/.

(Continued)

*Primary Examiner* — Nkeisha Smith
(74) *Attorney, Agent, or Firm* — Lowe Graham Jones PLLC; Bruce E. Black

(57) ABSTRACT

A mounting track includes a track section having a track base, two vertical track-rails, and horizontal track-beams laterally-spaced-apart from each other by a first distance. An endpiece is attachable to the track section and includes an endpiece base, a vertical endpiece rail, and horizontal endpiece beams. When attached to the track section, the track base and the endpiece base align, the vertical track-rails and the vertical endpiece rail align, and the horizontal track-beams and the horizontal endpiece beams align to form a continuous track within which a retention element of a mount assembly can move. The endpiece includes an insertion zone where opposing portions of the horizontal endpiece beams are spaced-apart from each other by a second distance that is larger than the first distance to facilitate insertion of the retention element into the track.

20 Claims, 11 Drawing Sheets

(56) References Cited

U.S. PATENT DOCUMENTS

| | | | |
|---|---|---|---|
| 1,455,441 A | 5/1923 | Hodny | |
| 1,509,068 A | 9/1924 | Herron | |
| 1,934,223 A | 11/1933 | Booth | |
| 2,029,089 A * | 1/1936 | Weirauch | E03C 1/322 248/201 |
| 2,114,767 A | 4/1938 | Hodny et al. | |
| 2,121,317 A | 6/1938 | Cohen | |
| D142,057 S | 8/1945 | Baxter | |
| 2,560,556 A | 7/1951 | Creedon | |
| 2,752,173 A | 6/1952 | Krooss | |
| 2,650,788 A | 9/1953 | Hulstein | |
| 2,688,504 A * | 9/1954 | Parker | B60P 7/0815 224/321 |
| 2,710,609 A | 6/1955 | Giller | |
| 2,723,823 A | 11/1955 | Polk | |
| 2,859,710 A * | 11/1958 | Elsner | A47B 91/08 248/502 |
| 2,861,501 A | 11/1958 | Strelakos | |
| 3,096,061 A | 7/1963 | Bertell | |
| 3,252,677 A | 5/1966 | Raymond | |
| 3,304,038 A | 2/1967 | Guthrie | |
| 3,605,637 A * | 9/1971 | Prete, Jr. | B60P 7/0815 410/105 |
| 3,652,050 A * | 3/1972 | Marrujo | B60N 2/01558 248/393 |
| 3,779,502 A * | 12/1973 | Marberg | B65D 19/44 410/116 |
| 3,843,272 A | 10/1974 | Jorn | |
| 4,060,241 A | 11/1977 | Hegel | |
| 4,060,331 A | 11/1977 | Domer et al. | |
| 4,066,231 A | 1/1978 | Bahner | |
| 4,066,311 A | 1/1978 | Poulson | |
| D247,420 S | 3/1978 | Reynolds | |
| 4,085,684 A * | 4/1978 | McLennan | B60P 7/0815 410/105 |
| 4,183,387 A * | 1/1980 | Lenz | F16B 35/06 411/116 |
| 4,205,486 A * | 6/1980 | Guarnacci | E06B 3/205 49/501 |
| 4,222,680 A | 9/1980 | Browning | |
| 4,225,258 A | 9/1980 | Thompson | |
| 4,307,864 A | 12/1981 | Benoit | |
| 4,461,284 A | 7/1984 | Fackler | |
| 4,491,435 A | 1/1985 | Meier | |
| 4,585,197 A | 4/1986 | Liautaud et al. | |
| 4,611,839 A | 9/1986 | Rung et al. | |
| 4,620,813 A | 11/1986 | Lacher | |
| 4,641,986 A * | 2/1987 | Tsui | B66C 1/66 24/115 K |
| 4,677,794 A * | 7/1987 | Parron | A47B 57/565 248/222.14 |
| 4,688,843 A * | 8/1987 | Hall | A61G 3/0808 248/503.1 |
| 4,796,508 A | 1/1989 | Hoshino | |
| 4,800,795 A | 1/1989 | Yamashita | |
| 4,805,784 A * | 2/1989 | Solheim | A47F 5/0846 211/59.1 |
| 4,842,308 A | 6/1989 | Spotts | |
| 4,872,630 A | 10/1989 | Cooper | |
| 4,950,099 A | 8/1990 | Roellin | |
| 5,071,279 A | 12/1991 | Rustrom | |
| 5,092,551 A | 3/1992 | Meier | |
| 5,109,321 A | 4/1992 | Maglica et al. | |
| 5,118,058 A | 6/1992 | Richter | |
| 5,241,796 A * | 9/1993 | Hellwig | E04B 2/7425 211/162 |
| 5,251,859 A | 10/1993 | Cyrell et al. | |
| 5,259,711 A * | 11/1993 | Beck | B60P 7/0815 410/101 |
| 5,270,911 A | 12/1993 | Maglica et al. | |
| 5,284,098 A * | 2/1994 | Klapperich | B65D 19/0002 108/55.5 |
| 5,305,700 A | 4/1994 | Strong et al. | |
| 5,419,522 A | 5/1995 | Luecke et al. | |
| 5,441,225 A | 8/1995 | Hall | |
| 5,564,668 A | 10/1996 | Crowe, II | |
| 5,628,597 A | 5/1997 | Chudoba et al. | |
| 5,727,858 A | 3/1998 | Shapiro | |
| 5,823,724 A * | 10/1998 | Lee | B60P 7/0815 410/104 |
| 5,845,885 A | 12/1998 | Carnevali | |
| 6,173,926 B1 | 1/2001 | Elvegaard | |
| 6,308,642 B1 * | 10/2001 | Branam | B65D 19/0002 108/55.1 |
| 6,561,476 B2 | 5/2003 | Carnevali | |
| 6,581,892 B2 | 6/2003 | Carnevali | |
| 6,588,722 B2 | 7/2003 | Eguchi et al. | |
| 6,666,420 B1 | 12/2003 | Carnevali | |
| 6,688,568 B1 | 2/2004 | Moufflet | |
| 6,695,183 B2 | 2/2004 | Hancock et al. | |
| 6,789,988 B1 * | 9/2004 | Moradians | B60P 7/0815 248/503 |
| 6,846,140 B2 * | 1/2005 | Anderson | B60P 7/0815 410/102 |
| 6,902,089 B2 | 6/2005 | Carnevali | |
| 6,945,414 B1 * | 9/2005 | Stevens | A47F 5/0846 211/183 |
| 7,090,181 B2 | 8/2006 | Biba et al. | |
| 7,100,808 B2 | 9/2006 | Hancock et al. | |
| 7,159,998 B2 * | 1/2007 | Moreland | F21V 21/34 362/219 |
| D539,639 S | 4/2007 | Nagle | |
| 7,277,240 B2 | 10/2007 | Carnevali | |
| 7,320,450 B2 | 1/2008 | Carnevali | |
| D563,781 S | 3/2008 | Carnevali | |
| D564,062 S | 3/2008 | Carnevali | |
| 7,337,934 B2 | 3/2008 | Alling et al. | |
| 7,401,995 B2 * | 7/2008 | Senakiewich, II | B60P 7/0815 403/374.4 |
| 7,422,184 B2 | 9/2008 | Carnevali | |
| D588,903 S | 3/2009 | Carnevali | |
| D589,327 S | 3/2009 | Carnevali | |
| D590,696 S | 4/2009 | Carnevali | |
| 7,523,904 B2 | 4/2009 | Carnevali | |
| 7,551,458 B2 | 6/2009 | Carnevali | |
| 7,571,522 B2 | 8/2009 | Carnevali | |
| 7,607,622 B2 | 10/2009 | Carnevali | |
| 7,682,543 B2 | 3/2010 | Carnevali | |
| 7,731,140 B2 | 6/2010 | Carnevali | |
| 7,774,973 B2 | 8/2010 | Carnevali | |
| D629,080 S | 12/2010 | Dole et al. | |
| 7,849,630 B2 | 12/2010 | Carnevali | |
| 7,850,133 B2 | 12/2010 | Carnevali | |
| 7,854,204 B2 * | 12/2010 | Dacus | B29C 70/088 108/51.3 |
| RE42,060 E | 1/2011 | Carnevali | |
| 7,887,018 B2 | 2/2011 | Carnevali | |
| 7,950,701 B2 | 5/2011 | Dole et al. | |
| 7,954,773 B2 | 6/2011 | Carnevali | |
| 7,975,971 B2 | 7/2011 | Carnevali | |
| 7,980,798 B1 * | 7/2011 | Kuehn | B61D 45/00 410/104 |
| RE42,581 E | 8/2011 | Carnevali | |
| 7,988,106 B2 | 8/2011 | Carnevali | |
| 8,020,828 B2 | 9/2011 | Carnevali | |
| 8,037,904 B2 | 10/2011 | Carnevali | |
| 8,156,681 B2 | 4/2012 | Carnevali | |
| 8,201,788 B2 | 6/2012 | Carnevali | |
| 8,235,340 B2 | 8/2012 | Carnevali | |
| RE43,806 E | 11/2012 | Carnevali | |
| 8,322,955 B2 * | 12/2012 | Arnesen | G06K 19/07749 248/346.02 |
| 8,408,853 B2 * | 4/2013 | Womack | B60P 7/0815 410/104 |
| 8,454,178 B2 | 6/2013 | Carnevali | |
| 8,505,861 B2 | 8/2013 | Carnevali | |
| 8,534,519 B2 | 9/2013 | Hancock et al. | |
| 8,590,855 B2 | 11/2013 | Carnevali | |
| 8,651,289 B2 | 2/2014 | Diaz, Jr. et al. | |
| 8,776,698 B2 * | 7/2014 | Pherson | B65D 19/0002 108/51.3 |

(56) References Cited

U.S. PATENT DOCUMENTS

| | | | |
|---|---|---|---|
| 8,992,238 B2* | 3/2015 | Chinn | F16B 21/09 |
| | | | 439/116 |
| 9,056,580 B2 | 6/2015 | Baldsiefen et al. | |
| 9,180,925 B2 | 11/2015 | Carnevali | |
| 9,253,970 B2 | 2/2016 | Carnevali | |
| 9,365,150 B2 | 6/2016 | Baldsiefen et al. | |
| 9,379,504 B2* | 6/2016 | Chinn | F16B 21/09 |
| 9,623,787 B2* | 4/2017 | Sterling | B60P 7/0807 |
| 9,671,060 B1 | 6/2017 | Cifers | |
| 9,828,073 B1* | 11/2017 | Cifers, III | B63B 35/71 |
| 9,944,217 B2* | 4/2018 | Schroeder | B60P 7/0815 |
| 9,975,466 B2* | 5/2018 | Hendren | B60P 7/0807 |
| 9,987,993 B2 | 6/2018 | Thorimbert | |
| 2003/0042282 A1 | 3/2003 | Gates et al. | |
| 2003/0185008 A1* | 10/2003 | Moreland | F21V 21/34 |
| | | | 362/249.01 |
| 2004/0178309 A1* | 9/2004 | Crowley | A47B 57/487 |
| | | | 248/244 |
| 2005/0036848 A1* | 2/2005 | Cunningham | B60P 7/0815 |
| | | | 410/104 |
| 2005/0092876 A1 | 5/2005 | Carnevali | |
| 2005/0132937 A1* | 6/2005 | Branam | B65D 19/0002 |
| | | | 108/55.5 |
| 2006/0000957 A1 | 1/2006 | Carnevali | |
| 2006/0102823 A1 | 5/2006 | Carnevali | |
| 2008/0115344 A1 | 5/2008 | Carnevali | |
| 2008/0296334 A1 | 12/2008 | Carnevali | |
| 2009/0014584 A1* | 1/2009 | Rudduck | B60N 2/071 |
| | | | 244/118.6 |
| 2009/0095206 A1* | 4/2009 | Dacus | B29C 70/088 |
| | | | 108/57.27 |
| 2009/0108151 A1 | 4/2009 | Carnevali | |
| 2009/0108152 A1 | 4/2009 | Carnevali | |
| 2009/0140112 A1 | 6/2009 | Carnevali | |
| 2009/0241293 A1 | 10/2009 | Swerdlick | |
| 2010/0282802 A1 | 11/2010 | Carnevali | |
| 2010/0284199 A1 | 11/2010 | Carnevali | |
| 2010/0288843 A1* | 11/2010 | Arnesen | G06K 19/07749 |
| | | | 235/492 |
| 2011/0097177 A1 | 4/2011 | Carnevali | |
| 2012/0006948 A1 | 1/2012 | Hiss et al. | |
| 2012/0181409 A1 | 7/2012 | Hayahara et al. | |
| 2012/0217353 A1 | 8/2012 | Hennon | |
| 2012/0318937 A1 | 12/2012 | Carnevali | |
| 2013/0133158 A1 | 5/2013 | Tran | |
| 2014/0003878 A1 | 1/2014 | Knox et al. | |
| 2014/0034794 A1 | 2/2014 | Carnevali | |
| 2014/0226315 A1* | 8/2014 | Nicieja | H01R 13/6205 |
| | | | 362/127 |
| 2014/0248103 A1 | 9/2014 | Baldsiefen et al. | |
| 2015/0030386 A1* | 1/2015 | Carnevali | F16B 21/02 |
| | | | 403/348 |
| 2015/0275942 A1 | 10/2015 | Carnevali | |
| 2016/0288691 A1* | 10/2016 | Aubrey | B60R 5/045 |
| 2017/0209318 A1* | 7/2017 | Schroeder | A61G 3/00 |

OTHER PUBLICATIONS

Yakattack.us, 4 pages of product description of GTTL retrieved from web site at: www.yakattack.us/geartrac/gttl/.

Yakattack.us, 6 pages of product description of GTSL90 retrieved from web site at: www.yakattack.us/by-product-name/geartrac/gtsl90/.

Yakattack.us, 5 pages of product description of GT90 retrieved from web site at: www.yakattack.us/geartrac/gt90/.

Yakattack.us, 4 pages of product description of GT175 retrieved from web site at: www.yakattack.us/geartrac/gt175/.

U.S. Appl. No. 15/650,732, filed Jul. 14, 2017.
U.S. Appl. No. 15/612,798, filed Jun. 2, 2017.
U.S. Appl. No. 15/627,102, filed Jun. 19, 2017.
U.S. Appl. No. 15/650,726, filed Jul. 14, 2017.

* cited by examiner

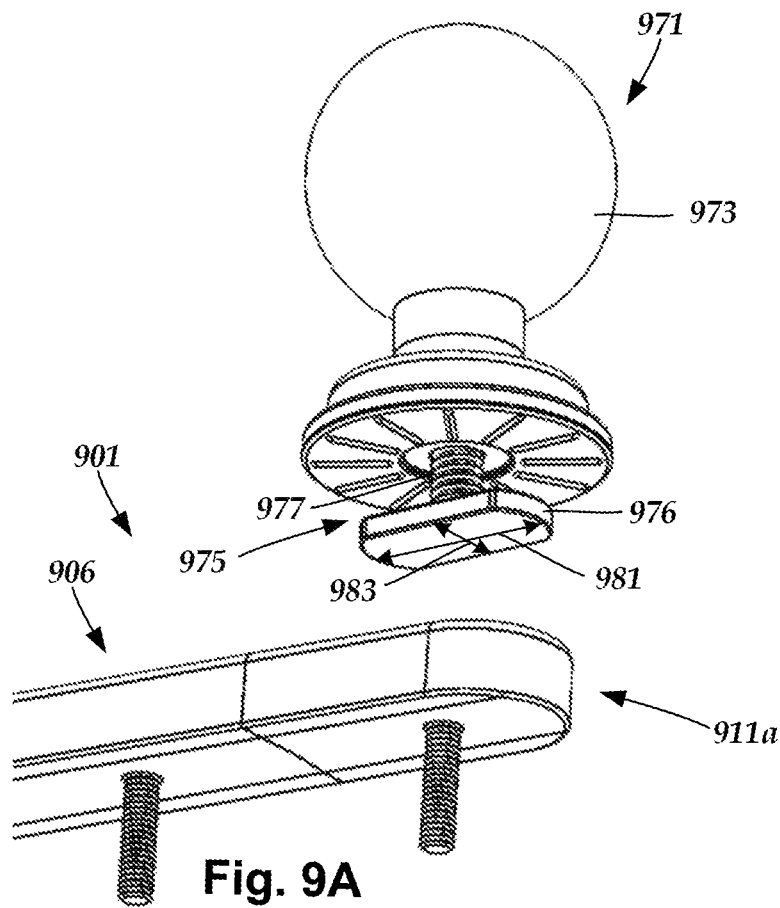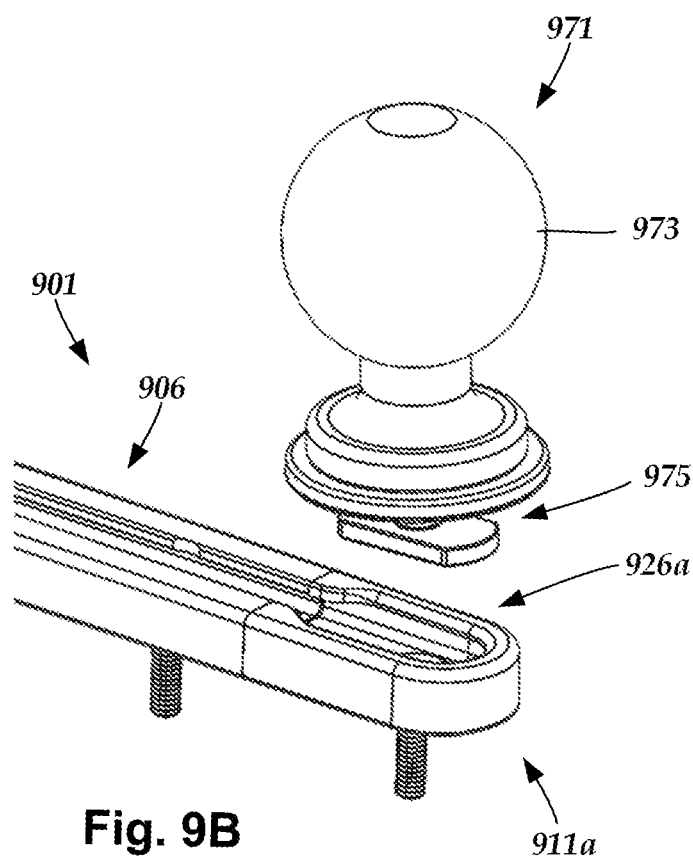

MOUNTING TRACK FOR RETAINING A MOUNT ASSEMBLY

FIELD

The present invention is directed to the area of mounting track systems. The present invention is also directed to a mounting track for retaining a mount assembly along a continuous track.

BACKGROUND

Providing mounts for holding, retaining, or securing objects has proven beneficial for many different uses. Some mountable-objects, such as electronic devices (e.g., phones, laptops, tablets, visual-enhancement devices, positioning devices, or the like), are increasingly used in situations where mounting the object to a surface increases the convenience of using the object. For example, in the case of hand-held devices, mounts eliminate the need to hold the device, or prop the device up, in order to use the device, thereby allowing a user to use the device, while simultaneously engaging in other activities which may benefit from the use of both hands without the encumberment of holding or propping-up the device. In some instances, mounting the device may increase user safety by enabling use of the device, without the distraction of holding the device.

Track systems enable an object to be held, retained, or secured, while also enabling limited movement of the object along a fixed path, or track. Attaching track systems to a surface provides a way to mount an object to the surface while also allowing flexibility of positioning of the object along portions of the surface along which the track system extends.

BRIEF SUMMARY

In one embodiment, a mounting track includes at least one track section having a track base, two vertical track rails extending opposite each other from the track base, and two horizontal track beams. Each of the horizontal track beams extends from a different one of the vertical track rails over the track base toward the other horizontal track beam. The horizontal track beams are laterally spaced apart from each other by a first distance. At least one endpiece is configured for attachment to the at least one track section. Each endpiece includes an endpiece base, a vertical endpiece rail extending from the endpiece base and forming a perimeter around a portion of the endpiece base, and two horizontal endpiece beams extending from the vertical endpiece rail over the endpiece base toward the other horizontal endpiece beam. When attached to the at least one track section, the track base and the endpiece base align, the vertical track rails and the vertical endpiece rail align, and the horizontal track beams and the horizontal endpiece beams align to form a continuous track within which a retention element of a mount assembly can move along the track. The track is closed at an end by at least the endpiece vertical rail. The at least one endpiece includes an insertion zone where at least two opposing portions of the two horizontal endpiece beams are spaced apart from each other by a second distance that is at least 10% larger than the first distance to facilitate insertion of the retention element of the mount assembly into the track.

In at least some embodiments, the at least one endpiece includes a first endpiece and a second endpiece, where the first endpiece is configured and arranged for attachment to a first end of the at least one track section and the second endpiece is configured and arranged for attachment to a second end of the at least one track section to form a continuous track extending from the first endpiece to the second endpiece.

In at least some embodiments, the at least one track section includes a first track section and a second track section disposed between the first endpiece and the second endpiece.

In at least some embodiments, an insertion piece is disposed between the first track section and the second track section. In at least some embodiments, the insertion piece includes an insertion-piece base, two vertical insertion-piece rails extending opposite each other from the insertion-piece base, and two horizontal insertion-piece beams, where each of the horizontal insertion-piece beams extends from a different one of the vertical insertion-piece rails over the insertion-piece base toward the other horizontal insertion-piece beam, where the horizontal insertion-piece beams are laterally spaced apart from each other by the first distance, and where the at least one insertion piece includes an insertion-piece insertion zone where at least two opposing portions of the two horizontal insertion-piece beams are spaced apart from each other by a second distance that is at least 10% larger than the first distance to facilitate insertion of the retention element of the mount into the track.

In at least some embodiments, an angled-piece is disposed between the first track section and the second track section, the angled-piece having a first end and an opposing second end and including a bend disposed between the first end and the second end, where the angled-piece extends in a first direction between the bend and the first end, and where the angled-piece extends in a second direction between the bend and the second end. In at least some embodiments, the first direction is perpendicular to the second direction.

In at least some embodiments, the angled-piece includes an angled-piece base, two vertical angled-piece rails extending opposite each other from the insertion-piece base, and two horizontal angled-piece beams, where each of the horizontal angled-piece beams extends from a different one of the vertical angled-piece rails over the insertion-piece base toward the other horizontal angled-piece beam, where the horizontal angled-piece beams are laterally spaced apart from each other by the first distance, where the angled-piece includes a multi-directional insertion zone where at least two opposing portions of the two horizontal angled-piece beams are spaced apart from each other by a second distance that is at least 10% larger than the first distance to facilitate insertion of the retention element of the mount into the track, and where the multi-directional insertion zone extends along each of the first direction and the second direction.

In at least some embodiments, the at least one endpiece is coupled to the at least one track section by corresponding interconnecting features disposed along the at least one endpiece and the at least one track section. In at least some embodiments, the interconnecting features include interconnecting tabs and slits. In at least some embodiments, the interconnecting features include interconnecting tabs and grooves.

In at least some embodiments, the track base of at least one of the at least one track section defines an alignment channel configured and arranged for facilitating alignment of a mount assembly relative to the mounting track when a retention element of the mount assembly is received by the continuous track. In at least some embodiments, the track base of at least one of the at least one track section defines a fastening aperture configured and arranged for receiving a fastener for fastening the at least one track section to a surface.

In another embodiment, a track-mounting system includes the mounting track described above and a mount assembly coupleable to the mounting track. The mount assembly includes a mount coupled to a retention element having a flange with a smallest lateral dimension that is greater than the first distance and at least one lateral dimension that is less than the second distance. The retention element is configured and arranged for insertion into the mounting track along the insertion zone and sliding along the continuous track to position the mount at a mounting location along the continuous track.

In at least some embodiments, the retention element is a T-bolt or a T-nut. In at least some embodiments, the mount is a ball. In at least some embodiments, the mount is a cleat. In at least some embodiments, the mounting track defines an alignment channel and the mount includes at least one guide feature configured and arranged for insertion into the alignment channel to control orientation of the mount relative to the mounting track.

In yet another embodiment, a method of coupling a mount assembly to a mounting track includes providing the mounting track described above; attaching the at least one endpiece of the mounting track to the at least one track section; inserting a retention element of a mount assembly into the insertion zone of the mounting track to retain the retention element within the mounting track; and sliding the mount assembly along the mounting track to a mounting location.

In at least some embodiments, the method further includes fastening the mounting track to a surface.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 9A is a schematic first perspective view of a first embodiment of a mount assembly disposed over a portion of the mounting track that includes an insertion zone disposed along an endpiece, the insertion zone suitable for receiving the mount assembly, according to the invention;

FIG. 9B is a schematic second perspective view of one embodiment of the mount assembly and mounting track portion of FIG. 9A, according to the invention;

DETAILED DESCRIPTION

The present invention is directed to the area of mounting track systems. The present invention is also directed to a mounting track for retaining a mount assembly along a continuous track.

A mounting track includes one or more track sections and at least one endpiece suitable for attaching to the track section(s) to form a continuous track along which a mount assembly can move. The continuous track retains a retention element of the mount assembly to restrict movement of the mount assembly to positions along the mounting track. The mounting track includes at least one insertion zone where the retention element can be inserted into the continuous track. In at least some embodiments, at least one insertion zone is disposed along the at least one endpiece.

The mounting track can, optionally, be attached to a surface (e.g., a vehicle surface, a dock, a countertop, a cabinet, a table, a floor, a wall, a ceiling, a ledge, or the like). The mounting track can be configured to the size and shape of the surface to which the mounting track is attached. The mounting track can be used to retain any suitable type of mount (e.g., a ball mount, a cleat, or the like or combinations thereof). The mounting track can be used to retain any suitable number of mount assemblies (e.g., one, two three, four, five, six, seven, eight, nine, ten, twenty, or more mount assemblies).

Retained mounts can be used to hold, retain, or secure any suitable type of object. In some embodiments, a retained mount provides a docking feature for docking with an object, such as an electronic device. In some embodiments, a retained mount is attached to an additional mount that facilitates docking of an object. In some embodiments, the mount can be used to secure the surface to which it is attached to another object. In some embodiments, the mount includes one or more guide features to enable the mount to be retained in the mounting track in a particular orientation relative to the mounting track.

Figure 1:
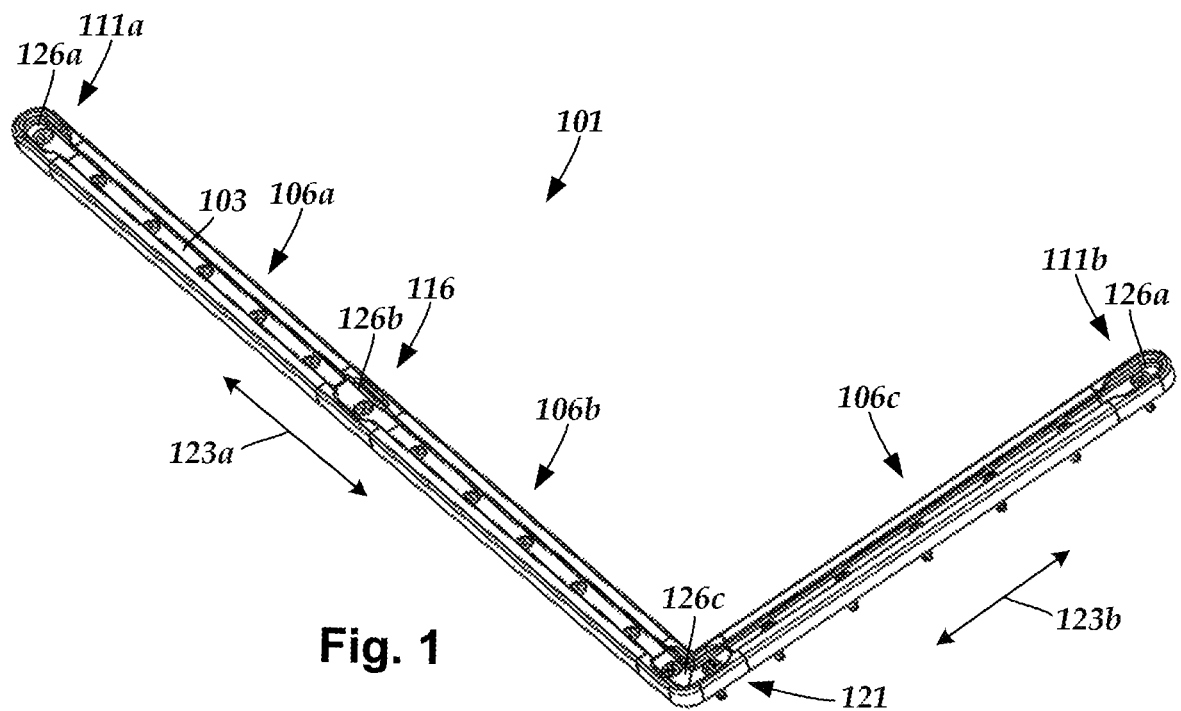
FIG. 1 is a schematic perspective view of one embodiment of a mounting track that includes track sections, endpieces, an insertion-piece, and an angled-piece coupled together to form a continuous track along which a retention element of a mount assembly can be inserted into and moved along, according to the invention.

FIG. 1 shows, in schematic perspective view, one embodiment of a mounting track 101 that includes a continuous track 103 formed from multiple track sections coupled together in an end-to-end configuration. The track sections are suitable for receiving a retention element of a mount assembly to retain the mount assembly while also enabling the mount assembly to be moved along the path of the continuous track 103 to a mounting location.

In the illustrated embodiment, the continuous track 103 includes track sections 106a, 106b, and 106c and endpieces 111a and 111b disposed along opposing ends of the mounting track 101. The mounting track includes at least one insertion zone that provides a location where a retention element of the mount assembly is insertable into the continuous track. In at least some embodiments, the insertion zone is disposed along at least one of the endpieces. In the illustrated embodiment, an insertion zone 126a is disposed along each of the endpieces 111a, 111b.

In at least some embodiments, the one or more insertion zones are the only locations where the mount assembly can be inserted (or removed) from the mounting track. The mounting track can include any suitable number of insertion zones including, for example, one, two, three, four, five, six, seven, eight, nine, ten, or more. It may be advantageous to intersperse insertion zones along stretches of multiple track sections to eliminate the need of moving mount assemblies along long stretches of track.

In at least some embodiments, the mounting track 101 includes at least one insertion-piece 116 with an insertion zone formed thereon. One or more insertion-pieces can be interspersed along the mounting track, as desired. For example, one or more insertion-pieces can be positioned between two track sections or between a track section and an endpiece.

The mounting track can extend in a single direction, or can extend in multiple different directions. In at least some embodiments, the mounting track 101 includes at least one angled-piece 121 that forms a bend that enables the mounting track to extend in several different directions therefrom. In the illustrated embodiment, the mounting track 101 extends in multiple different directions from the angled-piece 121, where one portion of the mounting track 101 extends along a first direction, as indicated by two-headed arrow 123a, and another portion of the mounting track 101 extends along a second direction, as indicated by two-headed arrow 123b, that is different from the first direction 123a.

In some embodiments, the angled-pieces include insertion zones disposed thereon. The insertion zones can be formed to enable insertion of a retention element of a mount assembly along the first direction, the second direction, or both the first and the second directions. In the embodiment illustrated in FIG. 1, in addition to the insertion zones 126a disposed along the endpieces 111a, 111b, the mounting track also includes insertion zone 126b disposed along an insertion-piece 116, and a multi-directional insertion zone 126c disposed along an angled-piece 121 that enables a mount assembly to be inserted along either the first direction 123a or the second direction 123b.

The mounting track can include any suitable number of track sections (e.g., one, two three, four, five, six, seven, eight, nine, ten, twenty, or more track sections). The mounting track can include any suitable number of insertion-pieces (e.g., zero, one, two three, four, five, six, seven, eight, nine, ten, or more insertion-pieces). The mounting track can include any suitable number of angled-pieces (e.g., zero, one, two three, four, five, six, seven, eight, nine, ten, or more angled-pieces).

The track sections, optional insertion-pieces, and optional angled-pieces can be positioned within the mounting track in any suitable order. It may be advantageous to configure the size and shape of the mounting track to accommodate the size and shape of the surface to which the mounting track is attached. Additionally, it may be advantageous to position the insertion zones to accommodate ease of inserting mount assemblies in proximity to their desired location(s) of use along the surface to which the mounting track is attached.

Figure 2:
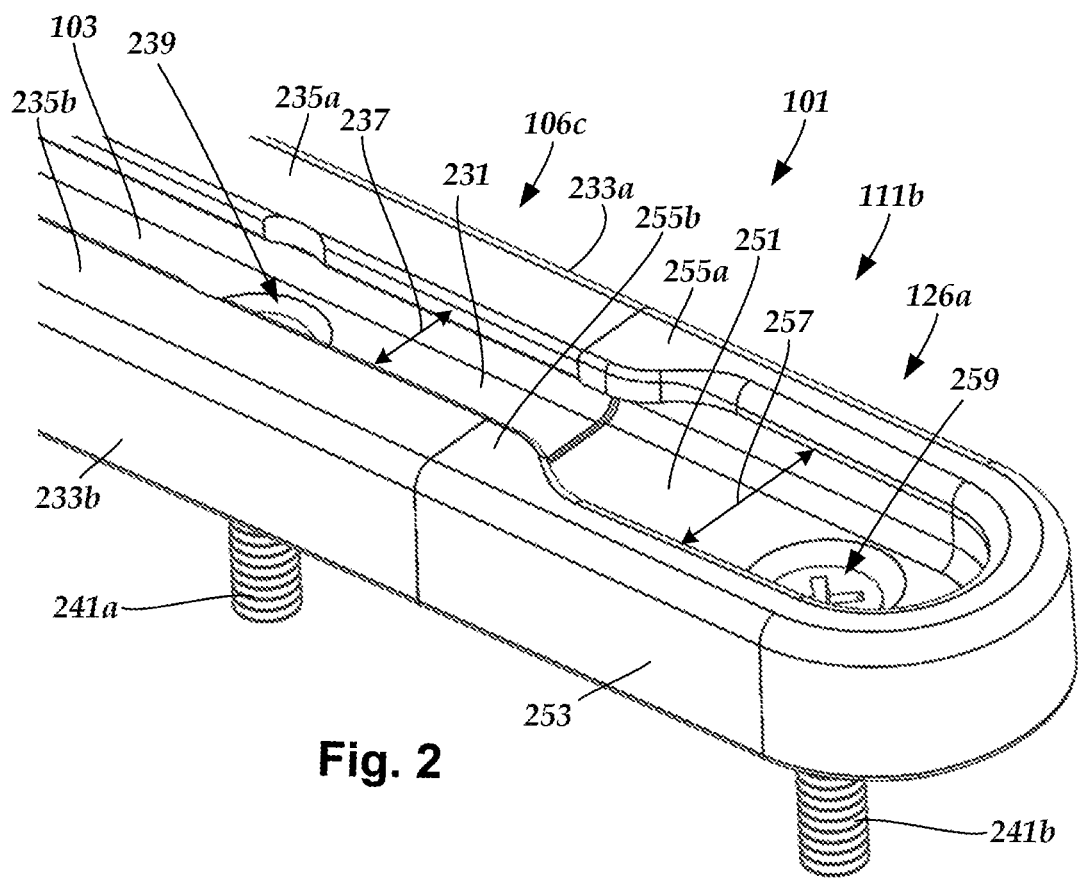
FIG. 2 is a schematic perspective view of one embodiment of a portion of the mounting track of FIG. 1 that includes one of the endpieces, the endpiece including an insertion zone along which a retention element of a mount assembly can be inserted into the track, according to the invention.

FIG. 2 shows, in schematic perspective view, one embodiment of a portion of the mounting track 101 that includes the endpiece 111b attached to a portion of the track section 106c. The track section 106a includes a track base 231 and two vertical track rails 233a, 233b extending opposite each other from the track base 231. Two horizontal track beams 235a, 235b extend from the vertical track rails 233a, 233b, respectively, over the track base 231 towards each other.

The horizontal track beams 235a, 235b are laterally spaced apart from each other by a first distance 237. In at least some embodiments, the horizontal track beams 235a, 235b are laterally spaced apart from each other by a first distance 237 along an entire longitudinal length of the track section 106b. In at least some embodiments, the horizontal track beams 235a, 235b of each track section of the mounting track are laterally spaced apart from each other by a first distance 237.

The endpiece 111b includes an endpiece base 251 and a vertical endpiece rail 253 extending from the endpiece base 251 and forming a perimeter around a portion of the endpiece base 251. Two horizontal endpiece beams 255a, 255b extend from the vertical endpiece rail 253 over the endpiece base 251 towards each other.

As illustrated in FIG. 2, when the endpiece 111b is coupled to the track section 106c, the track base 231 and the endpiece base 251 align; the vertical track rails 233a, 233b and the vertical endpiece rail 253 align; and the horizontal track beams 235a, 235b and the horizontal endpiece beams 255a, 255b, respectively, align to form the continuous track 103 within which a retention element of a mount assembly can be moved. The continuous track 103 is closed at one end by at least the vertical endpiece rail 253.

The endpiece 111b includes the insertion zone 126a where at least two opposing portions of the two horizontal endpiece beams 255a, 255b are spaced apart from each other by a second distance 257 that is larger than the first distance 237 to facilitate insertion of a retention element of the mount assembly into the continuous track. In at least some embodiments, the first distance 237 and the second distance 257 are relatively sized such that the second distance 257 is larger than a dimension (e.g., a width or a diameter) of the retention element that is transverse to the length of the mounting track at the insertion zone, while the first distance 237 is smaller than the transverse dimension of the retention element. In at least some embodiments, the second distance 257 is at least 5%, 10%, 15%, 20%, 25% larger than the first distance 237. In at least some embodiments, the second distance 257 is no more than 25%, 20%, 15%, 10%, 5% larger than the first distance 237.

The mounting track can, optionally, be attached to a surface. The mounting track can be attached to a surface in any suitable manner including, for example, one or more adhesives, or one or more fasteners (e.g., screws, nails, pins, or the like), hook and loop fasteners, or combinations thereof. FIG. 2 shows a fastening aperture 239 defined in the track base 231 and a fastening aperture 259 defined in the endpiece base 251. The fastening apertures 239, 259 are each suitable for receiving a fastener, such as fasteners 241a, 241b, respectively. It will be understood that one or more fastening apertures may, likewise, be defined in one or more insertion-pieces, or angled-pieces, or both.

Figure 3:
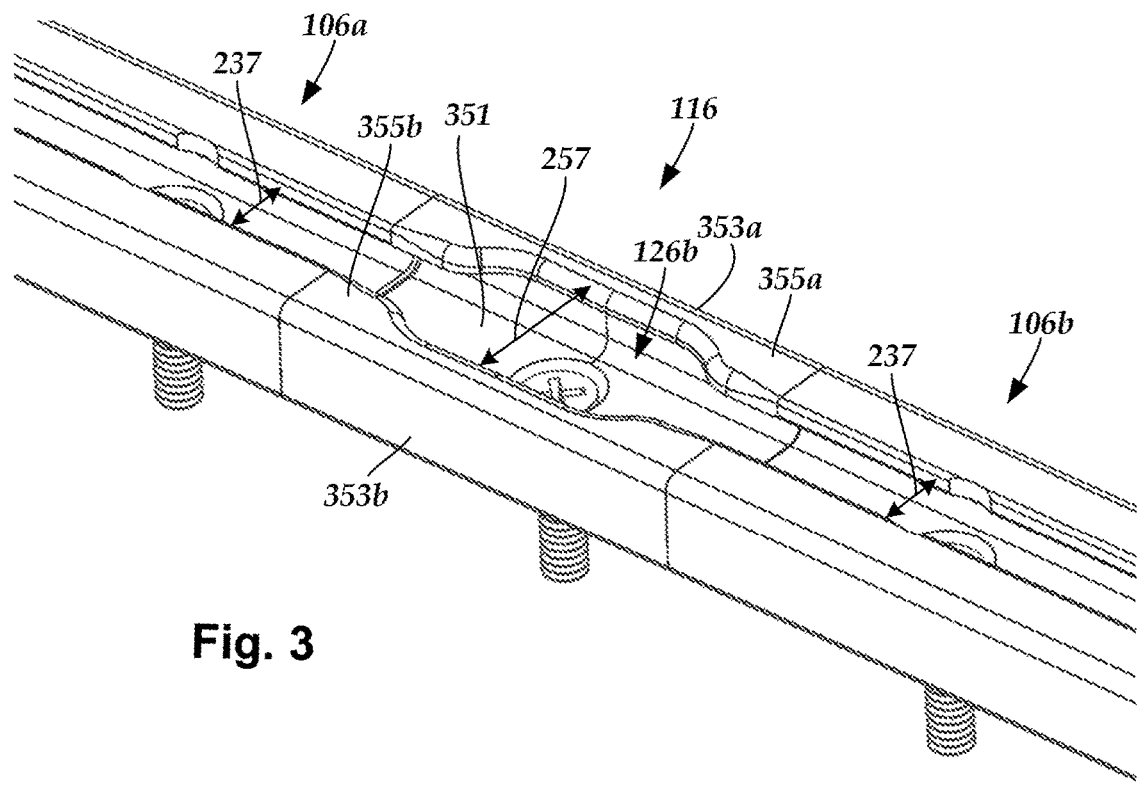
FIG. 3 is a schematic perspective view of one embodiment of a portion of the mounting track of FIG. 1 that includes the insertion-piece, the insertion-piece including an insertion zone along which a retention element of a mount assembly can be inserted into the track, according to the invention.

FIG. 3 shows, in schematic perspective view, one embodiment of a portion of the mounting track that includes the insertion-piece 116 coupled on one end to track section 106a and coupled on an opposing end to track section 106b.

The insertion-piece 116 includes an insertion-piece base 351 and two vertical insertion-piece rails 353a, 353b extending opposite each other from the insertion-piece base 351. Two horizontal insertion-piece beams 355a, 355b extend from the vertical insertion-piece rails 353a, 353b, respectively, over the insertion-piece base 351 towards each other.

A portion of the horizontal insertion-piece beams 355a, 355b are laterally spaced apart from each other by the first distance 237. As shown in FIG. 3, the horizontal track beams of the adjacent track sections 106a, 106b are also laterally spaced apart from each other by the first distance 237. The insertion-piece 116 includes the insertion zone 126b where at least two opposing portions of the two horizontal insertion-piece beams 355a, 355b are spaced apart from each other by the second distance 257 (that is larger than the first distance 237) to facilitate insertion of a retention element of the mount assembly into the track.

As illustrated in FIG. 3, when the insertion-piece 116 is coupled to the track sections 106a, 106b, the insertion-piece base 351, vertical insertion-piece rails 353a, 353b, the horizontal insertion-piece beams 355a, 355b align with the corresponding portions of the track sections 106a, 106b to form a portion of the continuous track within which a retention element of a mount assembly can be moved.

Figure 4:
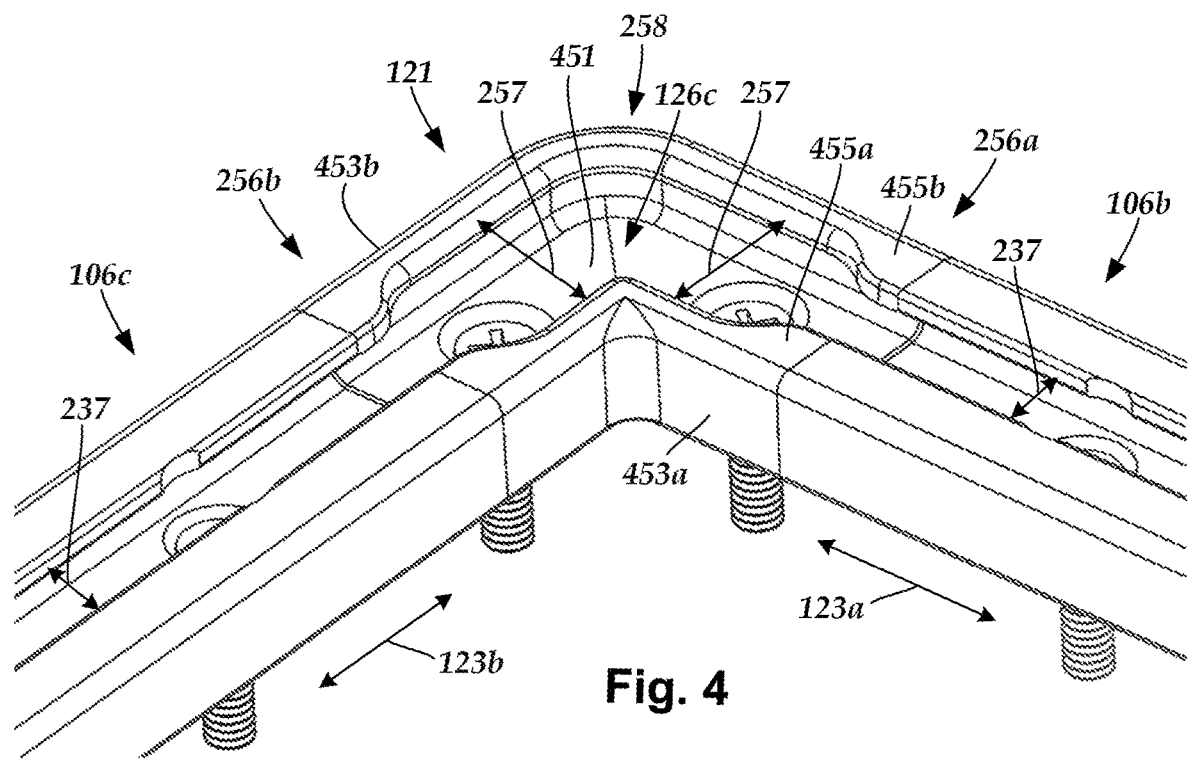
FIG. 4 is a schematic perspective view of one embodiment of a portion of the mounting track of FIG. 1 that includes the angled-piece, the insertion piece including an insertion zone along which a retention element of a mount assembly can be inserted into the track, according to the invention.

FIG. 4 shows, in schematic perspective view, one embodiment of a portion of the mounting track that includes the angled-piece 121 coupled on one end to track section 106b. The angled-piece 121 includes a bend 258 and opposing first and second ends 256a and 256b, respectively. The angled-piece 121 extends from the bend 258 to the first end 256a along the first direction 123a, and from the bend 258 to the second end 256b in the second direction 123b. In the illustrated embodiment, the first end 256a is coupled to the track section 106b, which continues to extend along the first direction 123a, and the second end 256b is coupled to the track section 106c, which continues to extend along the second direction 123b. The bend 258 can form any suitable angle along the angled-piece 121 including, for example, 10°, 20°, 30°, 45°, 60°, 70°, 80°, 90°, 100°, 110°, 120°, 135°, 150°, 160°, or 170°.

The angled-piece 121 includes an angled-piece base 451 and two vertical angled-piece rails 453a, 453b extending opposite each other from the angled-piece base 451. Two horizontal angled-piece beams 455a, 455b extend from the vertical angled-piece rails 453a, 453b, respectively, over the angled-piece base 451 towards each other.

A portion of the horizontal angled-piece beams 455a, 455b are laterally spaced apart from each other by the first distance 237. As shown in FIG. 4, the horizontal track beams of the adjacent track sections 106a, 106b are also laterally spaced apart from each other by the first distance 237.

The angled-piece 121 includes the multi-directional insertion zone 126c where opposing portions of the two horizontal angled-piece beams 455a, 455b are spaced apart from each other by the second distance 257 (that is larger than the first distance 237) to facilitate insertion of a retention element of the mount assembly into the track. As shown in FIG. 4, the two horizontal angled-piece beams 455a, 455b are spaced apart from each other by the second distance 257 along both the first direction 123a and the second direction 123b, thereby enabling insertion of a retention element into the continuous track along either track section 106b or 106c.

As illustrated in FIG. 4, when the angled-piece 121 is attached to the track sections 106b, 106c, the angled-piece base 431, vertical angled-piece rails 453a, 453b, the horizontal angled-piece beams 455a, 455b align with the corresponding portions of the track sections 106b, 106c to form a portion of the continuous track within which a retention element of a mount assembly can be moved.

Turning to FIG. 5-8B, in some embodiments the mounting track is pre-assembled prior to being received by an end user. When pre-assembled, the mounting track can be permanently assembled, or can be disassemble-able. In other embodiments, the mounting track is assembled together by an end user. In at least some embodiments, the mounting track can be assembled in a first configuration, disassembled, and re-assembled in either the first configuration or one or more second configurations that are different from the first configuration with the same components or with one or more additional (or fewer) track sections, endpieces, insertion-pieces, or angled-pieces.

The track sections, endpieces, insertion-pieces, or angled-pieces can be coupled together using any suitable technique including, for example, adhesives, hook and loop fasteners, snaps, or the like. In at least some embodiments, the individual components of the mounting track are coupleable via interconnecting features, such as tabs and slits or tabs and grooves, disposed along adjacent track components (e.g., track sections, endpiece, insertion-pieces, angled-pieces).

The interconnecting features can be positioned in any combination along the end portions of the track components. The interconnecting features can be positioned along the vertical rails, bases, horizontal beams, or combination thereof. In some embodiments, the male interconnecting features are disposed along the pieces (the endpieces, insertion-pieces, angled-pieces), while the female interconnecting features are defined along the track sections. In other embodiments, the female interconnecting features are defined along the pieces (the endpieces, insertion-pieces, angled-pieces), while the male interconnecting features are disposed along the track sections.

Figure 5:
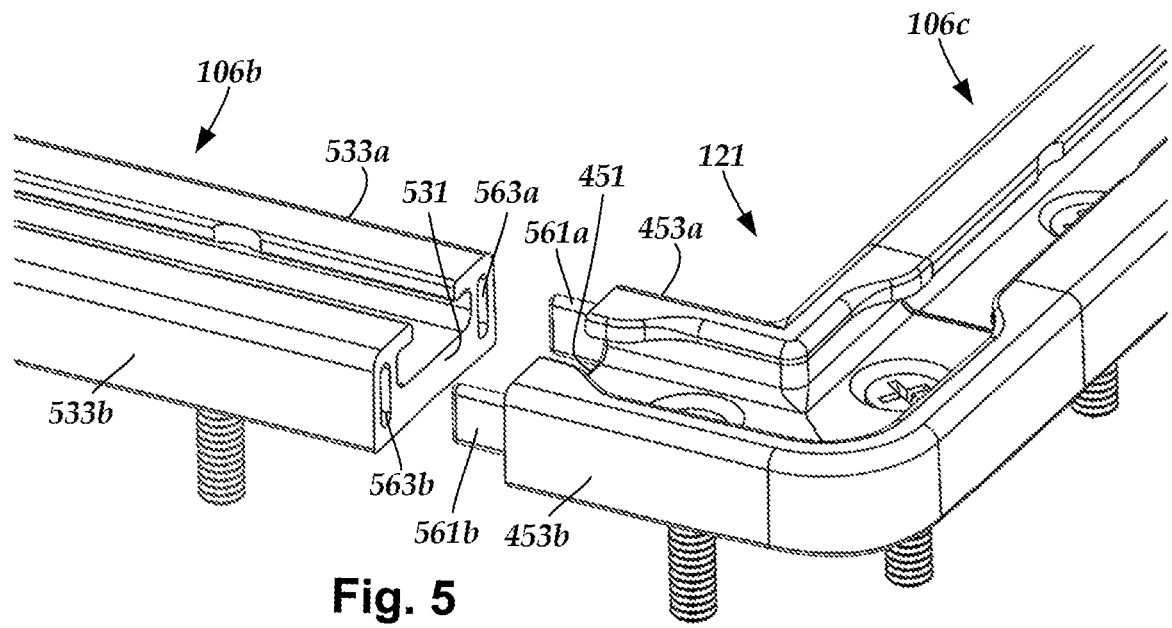
FIG. 5 is a schematic perspective view of one embodiment of a portion of the mounting track of FIG. 1 with the angled-piece uncoupled from one of the track sections to show a coupling system of interconnecting tabs and slits, according to the invention.

FIG. 5 shows, in schematic perspective view, one embodiment of a portion of the mounting track with the track section 106*b* uncoupled from the angled-piece 121 to show one embodiment of a coupling system utilizing interconnecting tabs and slits. In FIG. 5, the angled-piece 121 includes tabs 561*a*, 561*b* projecting from an end of the vertical angled-piece rails 453*a*, 453*b*. The tabs 561*a*, 561*b* are configured to interconnect with slits 563*a*, 563*b*, respectively, defined in an end of the vertical track rails 533*a*, 533*b*, respectively, of track section 106*b*.

Figure 6:
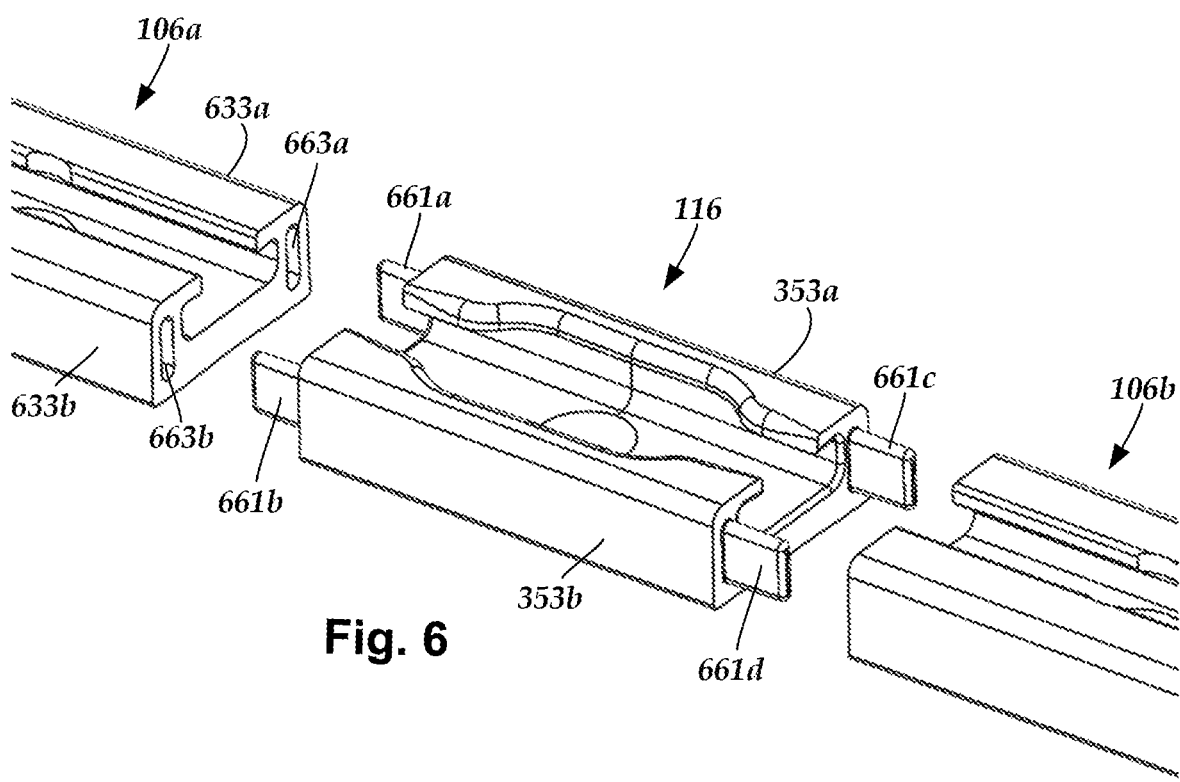
FIG. 6 is a schematic perspective view of one embodiment of a portion of the mounting track of FIG. 1 with the insertion piece uncoupled from one of the track sections to show the coupling system of interconnecting tabs and slits, according to the invention.

FIG. 6 shows, in schematic perspective view, one embodiment of a portion of the mounting track 101 with the insertion-piece 116 uncoupled at a first end from the track section 106*a* and uncoupled at an opposing second end from track section 106*b*. In FIG. 6, the insertion-piece 116 includes tabs 661*a*-661*d* projecting from the vertical angled-piece rails 353*a*, 353*b*. The tabs 661*a*, 661*b* are configured to interconnect with slits 663*a*, 663*b*, respectively, defined in vertical track rails 633*a*, 633*b*, respectively, of track section 106*a*. Similarly, tabs 661*c*, 661*d* are configured to interconnect with slits (not shown) defined in vertical track rails of track section 106*b*.

Figure 7:
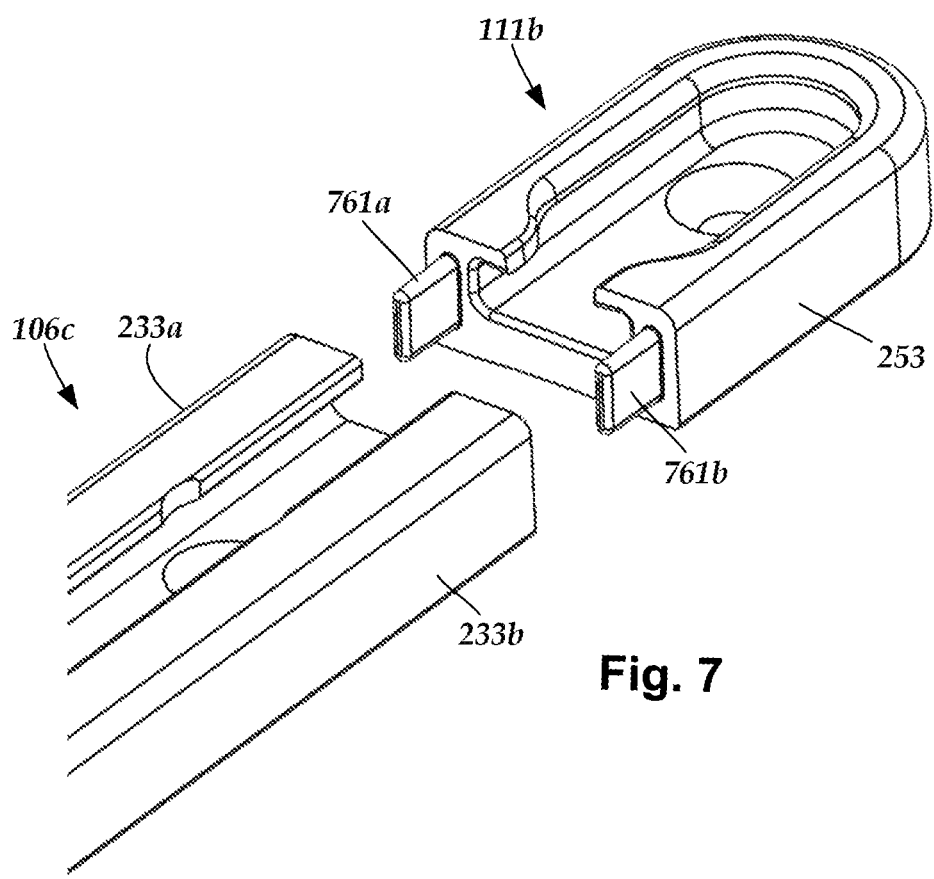
FIG. 7 is a schematic perspective view of one embodiment of a portion of the mounting track of FIG. 1 with one of the endpieces uncoupled from one of the track sections to show the coupling system of interconnecting tabs and slits, according to the invention.

FIG. 7 shows, in schematic perspective view, one embodiment of a portion of the mounting track 101 with the endpiece 111*b* uncoupled from the track section 106*c*. In FIG. 7, the endpiece 111*b* includes tabs 761*a*, 761*b* projecting from opposing ends of the vertical endpiece rail 253. The tabs 661*a*, 661*b* are configured to interconnect with slits (not shown) defined in vertical track rails 233*a*, 233*b* of the track section 106*b*.

Figure 8A:
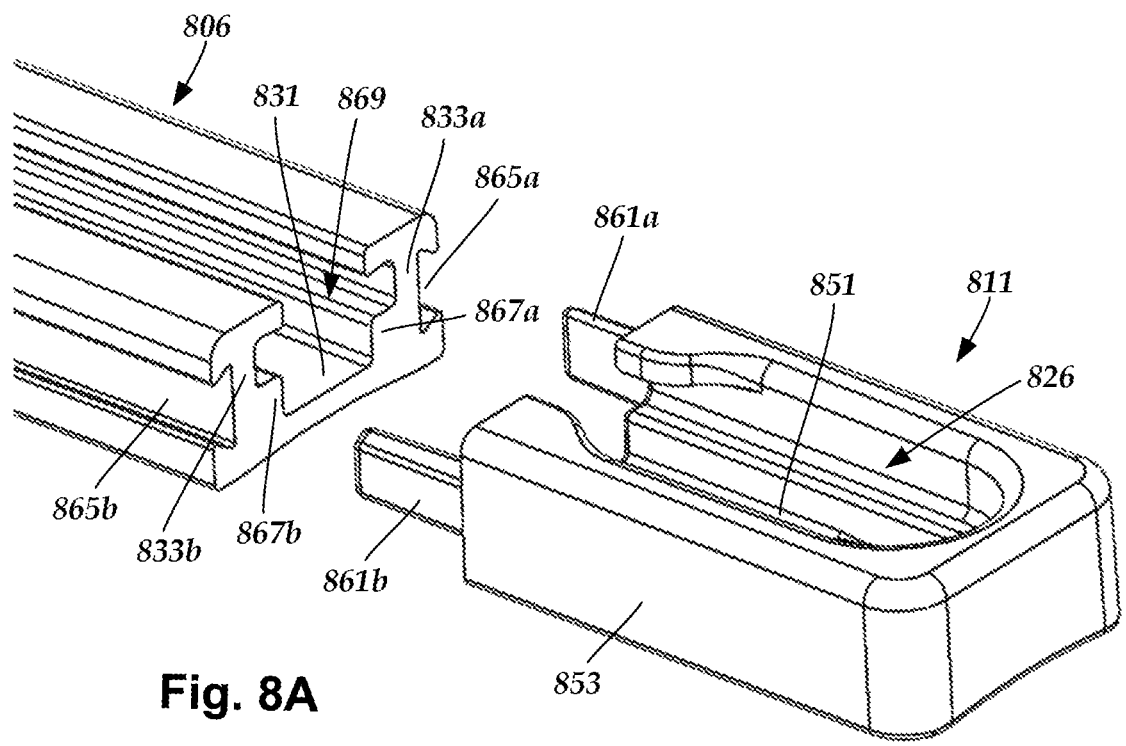
FIG. 8A is a schematic perspective view of an alternate embodiment of a portion of a mounting track that includes an endpiece uncoupled from a track section to show a coupling system of interconnecting tabs and grooves, according to the invention.
Figure 8B:
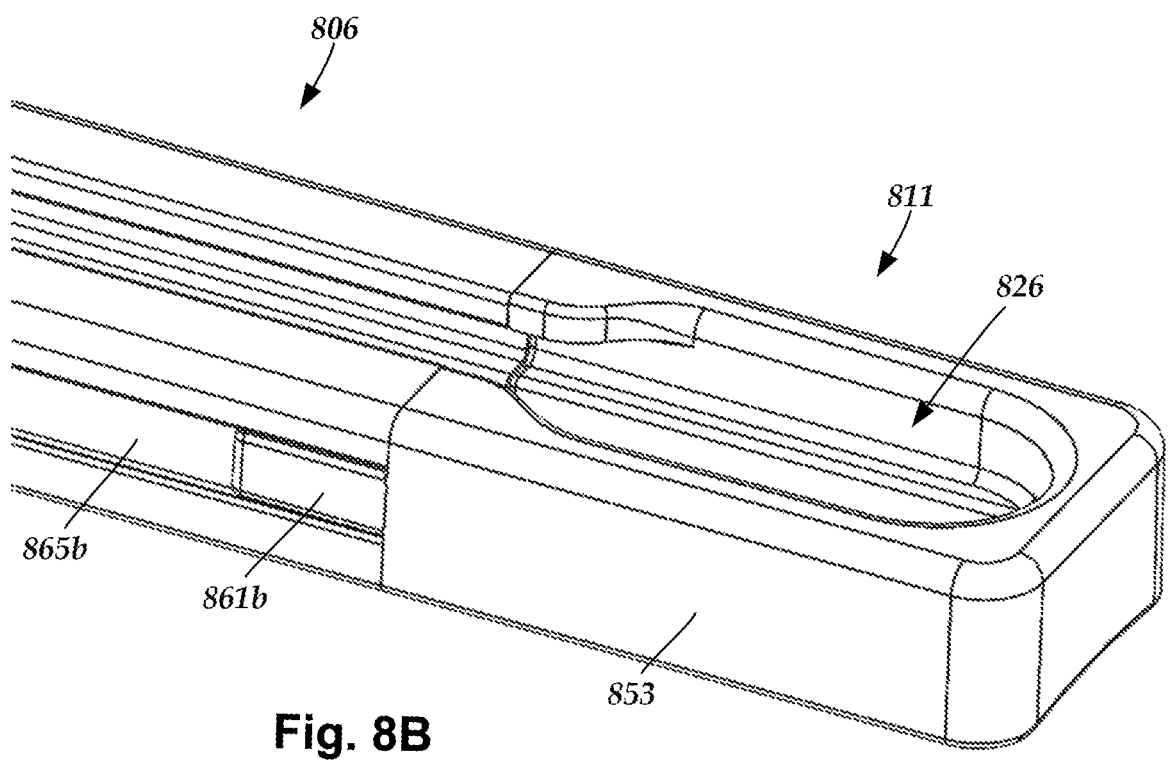
FIG. 8B is a schematic perspective view of one embodiment of the portion of the mounting track of FIG. 8A with the endpiece coupled to the track section using the coupling system of interconnecting tabs and grooves, according to the invention.

Turning to FIGS. 8A-8B, in at least some embodiments the interconnecting features for coupling together components of the mounting track include interconnecting tabs and grooves in lieu of, or in addition to, interconnecting tabs and slits. FIG. 8A shows, in schematic perspective view, one embodiment of a portion of a track section 806 uncoupled from an endpiece 811 with an insertion zone 826 to show an alternate embodiment of a coupling system of interconnecting features. FIG. 8B shows, in schematic perspective view, one embodiment of the track section 806 coupled to the endpiece 811.

In FIGS. 8A-8B, the endpiece 811 includes a vertical endpiece rail 853 extending from an endpiece base 851 and forming a perimeter around a portion of the endpiece base 851. The endpiece 811 includes tabs 861*a*, 861*b* projecting from one end of the endpiece 811 along opposing portions of the vertical endpiece rail 853.

The track section 806 includes vertical track sections 833*a*, 833*b* extending from a track base 831. Grooves 865*a*, 865*b* are defined along outer walls of the vertical track sections 833*a*, 833*b*. The grooves 865*a*, 865*b* are configured and arranged to interconnect with the tabs 861*a*, 861*b* of the endpiece 811. In at least some embodiments, the grooves 865*a*, 865*b* extend along an entire length of the track section 806, thereby enabling a similar coupling to be made along an opposing end of the track section 806 with tabs extending from another component of the mounting track.

The illustrated embodiment also shows shoulders 867*a*, 867*b* disposed along inner walls of the vertical track sections 833*a*, 833*b* at an interface between the vertical track sections 833*a*, 833*b* and the track base 831. In at least some embodiments, similar shoulders are disposed along corresponding portions of the endpiece 811. In at least some embodiments, similar shoulders are disposed along corresponding portions of insertion-pieces and angled-pieces. The shoulders form an alignment channel 869 that enable guide features of a mount assembly to extend into the track to facilitate maintaining of a particular orientation of the mounting assembly relative to the mounting track. In at least some embodiments, a region between the horizontal beams and above the shoulders functions as the alignment channel, while a region between the shoulders retains the retention element of the mount assembly.

As illustrated in FIGS. 8A-8B, when the endpiece 811 is attached to the track section 806, the track base 831 and the endpiece base 851 align; the vertical track rails 833*a*, 833*b* and the vertical endpiece rail 853 align to form a continuous track within which a retention element of a mount assembly can move along the track.

Turning to FIGS. 9A-10E, the mounting track can be used to retain a retention element of a mounting assembly. Any suitable retention element can be used. In at least some embodiments, the retention element includes a flange configured for retention beneath opposing horizontal beams of the continuous track, while one or more elongated members coupled to the flange extend outward from the continuous track to a position over the mounting track and couple with a mount. In at least some embodiments, the flange and the elongated member are a unitary structure, such as a T-bolt. In at least some embodiments, the elongated member is threaded. In at least some embodiments, mounts can be removed from the elongated member and swapped out for other mounts, as desired.

Figure 9C:
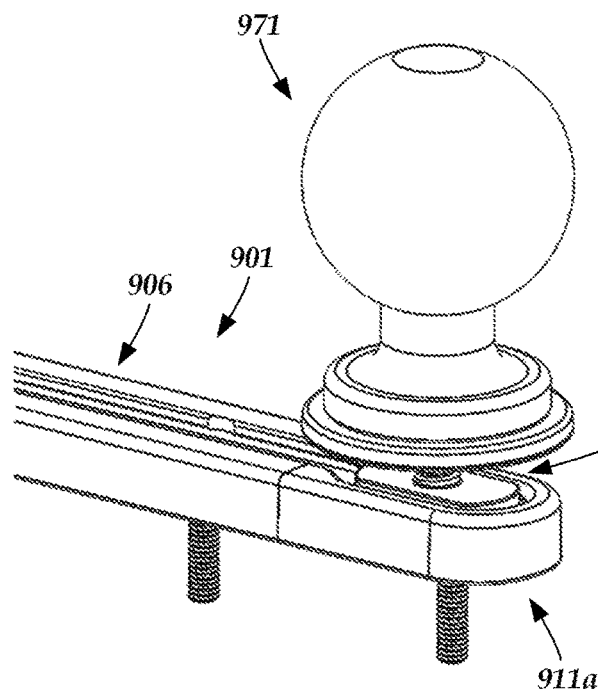
FIG. 9C is a schematic perspective view of one embodiment of the mount assembly and mounting track portion of FIGS. 9A-9B with a retention element of the mount assembly partially inserted into the insertion zone of the mounting track, according to the invention.

In FIGS. 9A-9G, a mounting track is configured for receiving a mount assembly that includes a ball mount. FIGS. 9A-9B show, in a schematic perspective views, a mount assembly 971 that includes a ball mount 973 coupled to the retention element 975 that includes a flange 976 coupled to an elongated member 977. The retention element 975 and the elongated member can, optionally, be a single component, such as a T-bolt. The mount assembly can, optionally, include multiple retention elements, elongated members, or both.

The mounting assembly 971 is shown disposed over a portion of a mounting track 901 that includes a track section 901 coupled to an endpiece 911*a*. In at least some embodiments, the retention element includes a flange having a smallest lateral dimension that is greater than the first distance (see e.g., 237 in FIG. 2) and at least one lateral dimension that is less than the second distance (see e.g., 257 in FIG. 2), thereby enabling the retention element to be inserted into an insertion zone and retained by the continuous track along any non-insertion-zone portion of the continuous track.

In the embodiment illustrated in FIG. 9B, the flange of the retention element 975 is shown as being substantially flat with a first axis 981 and a second axis 983, where the second axis 983 is larger than the first distance (see e.g., 237 in FIG. 2) and smaller than the second distance (see e.g., 257 in FIG. 2), while the first axis is larger than both the first distance (see e.g., 237 in FIG. 2) and the second distance (see e.g., 257 in FIG. 2). In some instances, such a configuration may reduce, or even prevent, rotation of the retention element relative to the continuous track while the mounting assembly is retained in the continuous track.

Figure 9D:
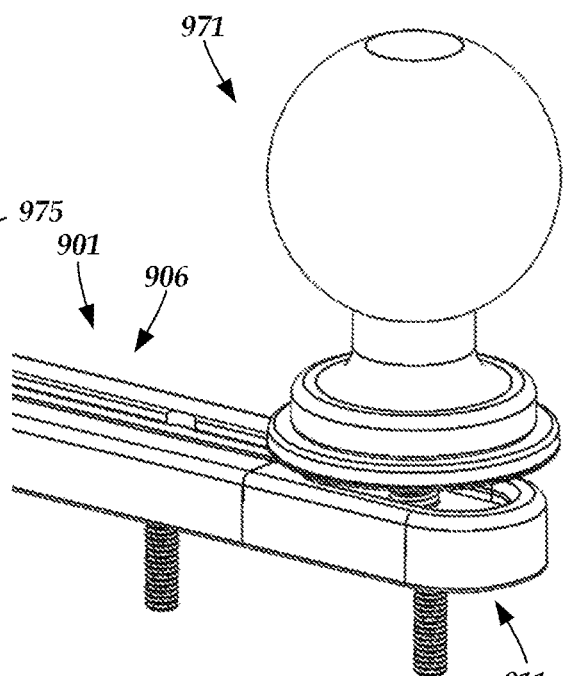
FIG. 9D is a schematic perspective view of one embodiment of the mount assembly and mounting track portion of FIGS. 9A-9B with a retention element of the mount assembly fully inserted into the insertion zone of the mounting track, according to the invention.

FIG. 9C shows, in schematic perspective view, one embodiment of the mount assembly 971 partially inserted into the insertion zone 926*a* of the endpiece 911*a* of the mounting track 901. FIG. 9D shows, in schematic perspective view, one embodiment of the mount assembly 971 fully inserted into the insertion zone 926*a* of the endpiece 911*a* of the mounting track 901.

Figure 9E:
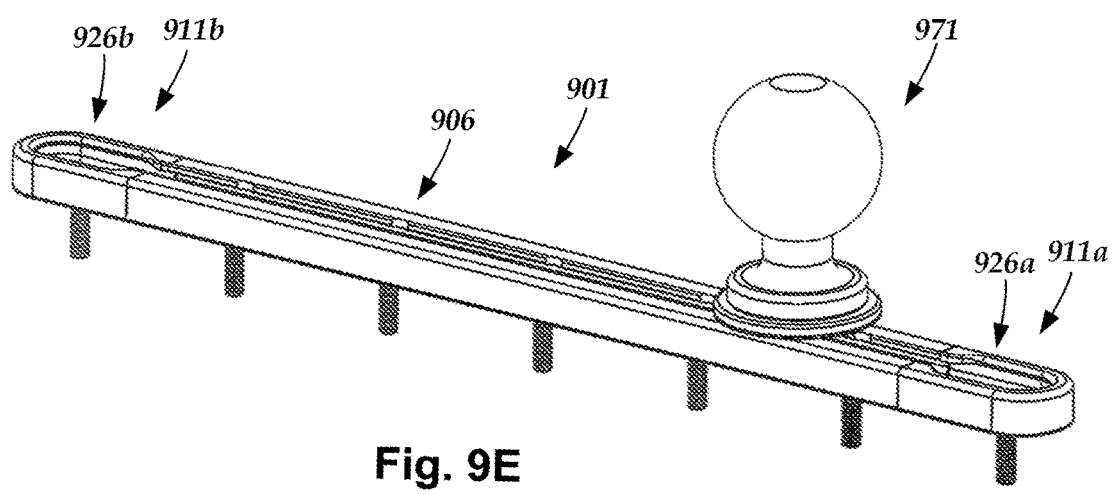
FIG. 9E is a schematic perspective view of one embodiment of the mount assembly and mounting track of FIGS. 9A-9B with a retention element of the mount assembly fully inserted into the insertion zone of the mounting track and slid onto an adjacent track section, according to the invention.

FIG. 9E shows, in schematic perspective view, one embodiment of the mount assembly 971 fully inserted into the insertion zone 926*a* of the endpiece 911*a* of the mounting track 901 and slid onto the track section 906. In the illustrated embodiment, the mounting track 901 further includes a second endpiece 911*b* coupled to an opposite end of the track section 906 from the endpiece 911*a*. The second endpiece 911*b* also includes an insertion zone 926*b*. Consequently, in at least some embodiments, the mounting assembly 971 is insertable into the mounting track along either insertion zone 926*a* or 926*b*. In at least some embodiments, the mounting assembly 971 is removable from the mounting track 901 from either insertion zone 926*a* or 926*b*.

Figure 9F:
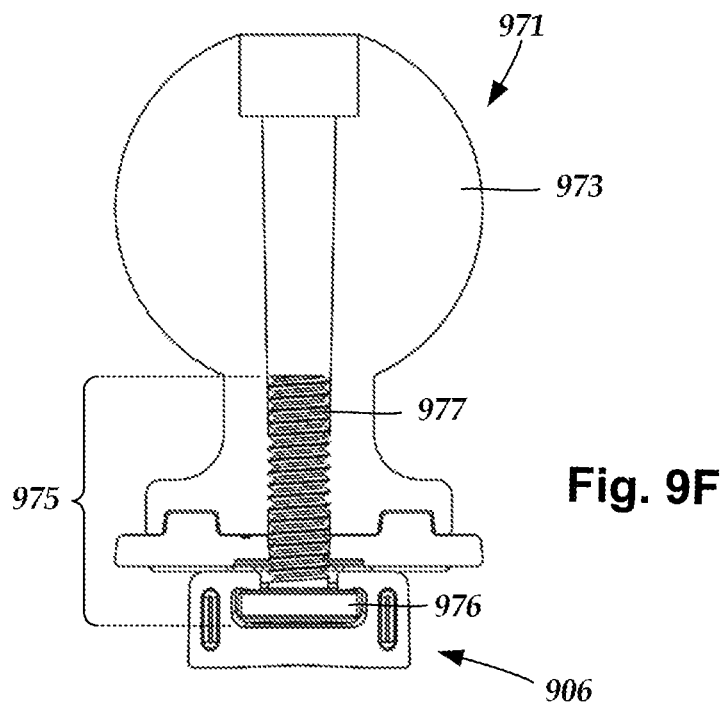
FIG. 9F is a schematic cross-sectional side view of one embodiment of the mount assembly of FIG. 9E received along a portion of the mounting track of FIG. 9E, according to the invention.
Figure 9G:
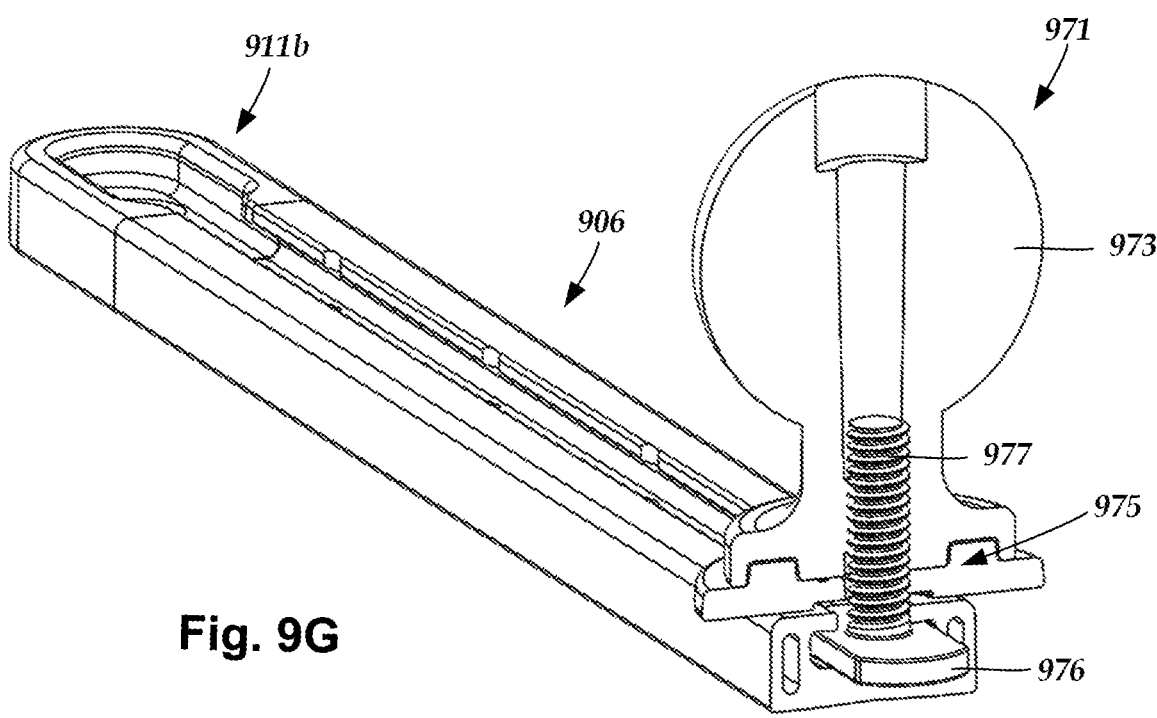
FIG. 9G is a schematic cross-sectional perspective view of one embodiment of the mount assembly of FIGS. 9E-9F received along a portion of the mounting track of FIGS. 9E-9F, according to the invention.

FIG. 9F shows, in schematic cross-sectional side view, one embodiment of the mount assembly 971 retained along a portion of the mounting track 901. FIG. 9G shows, in schematic cross-sectional perspective view, one embodiment of the mount assembly 971 retained along a portion of the mounting track 901.

Figure 10A:
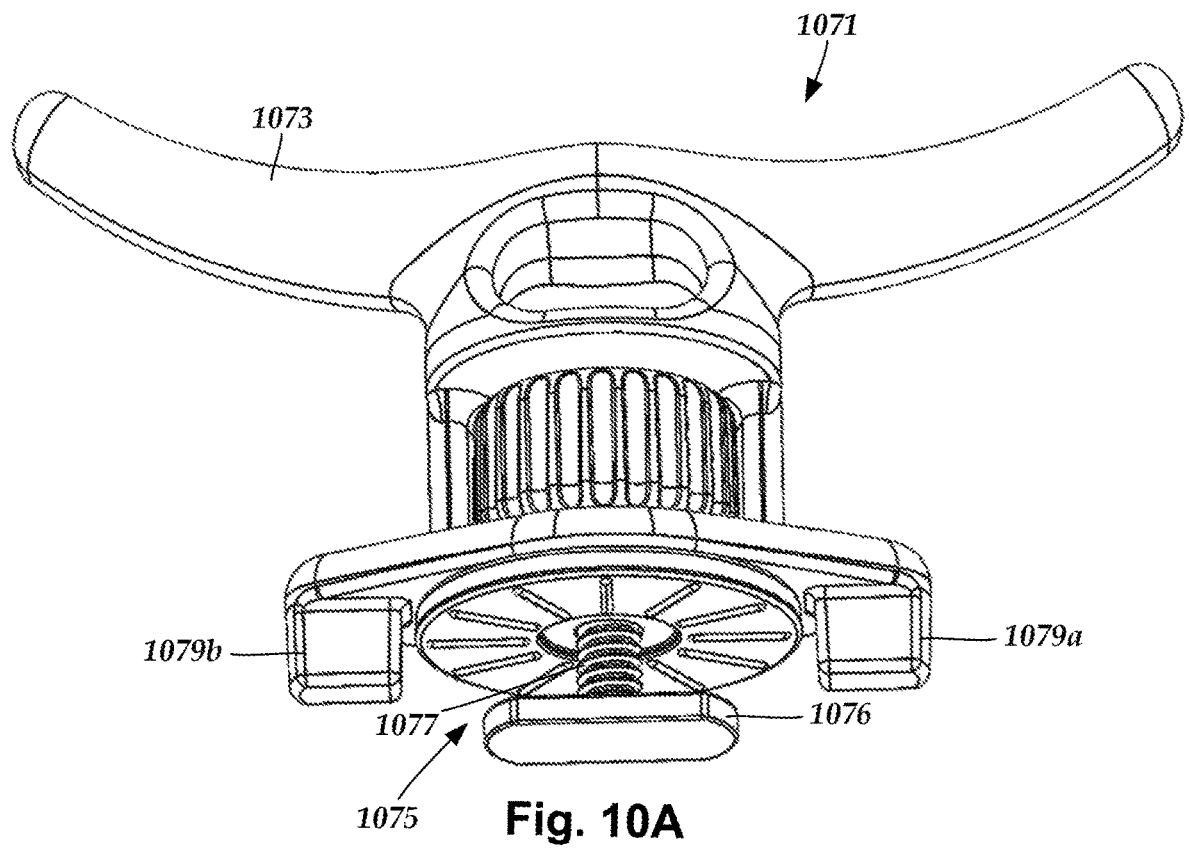
FIG. 10A is a schematic perspective view of a second embodiment of a mount assembly suitable for being received by a mounting track, according to the invention.
Figure 10B:
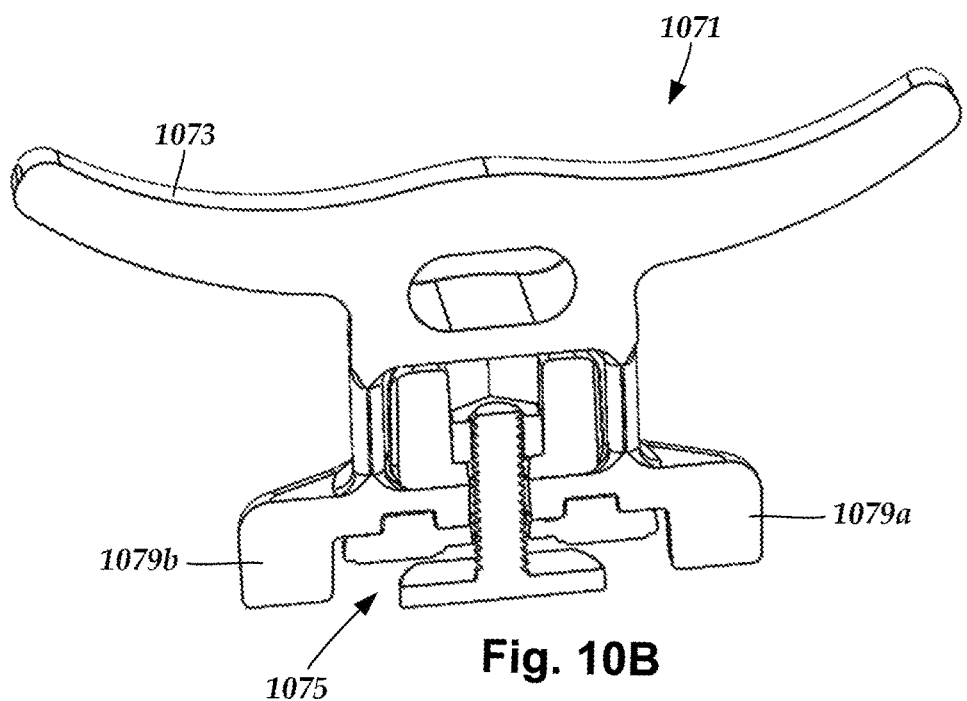
FIG. 10B is a schematic perspective cross-sectional view of one embodiment of the mount assembly of FIG. 10A, according to the invention.

In at least some embodiments, the mounting assembly includes a cleat. FIG. 10A shows, in schematic perspective view, one embodiment of a mount assembly 1071 suitable for being received by a mounting track. FIG. 10B shows, in schematic cross-sectional perspective view, one embodiment of the mount assembly 1071. As shown in FIGS. 10A-10B, the mount assembly 1071 includes a mount that is formed as a cleat 1073 and is attached to a retention element 1075. In some embodiments, the cleat 1073 includes one or more optional guide features 1079*a*, 1079*b* for facilitating the maintaining of a particular orientation of the cleat 1073 relative to the mounting track.

Figure 10C:
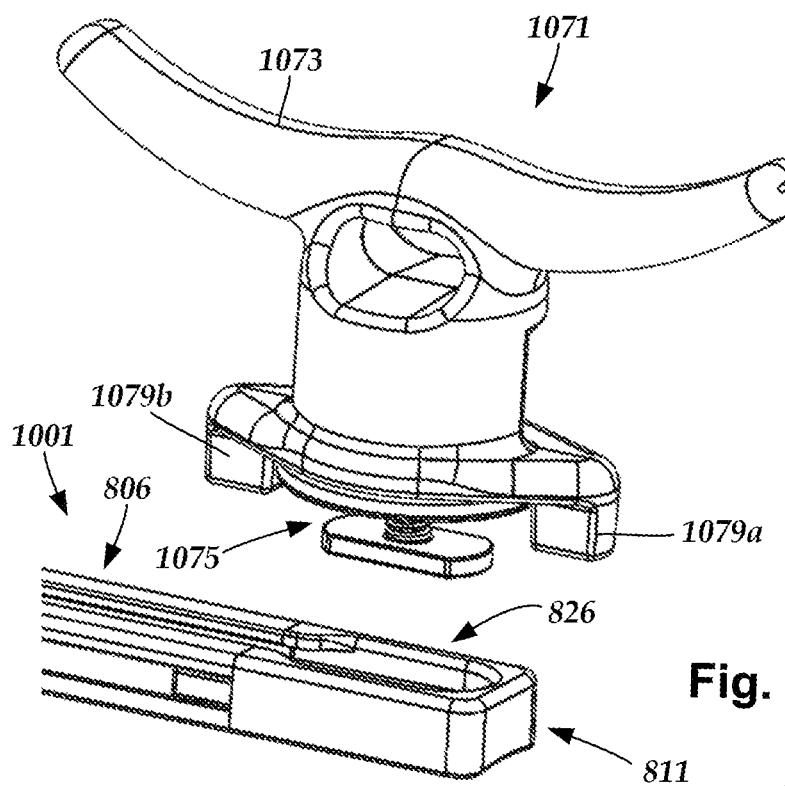
FIG. 10C is a schematic perspective view of one embodiment of the mount assembly of FIGS. 10A-10B disposed over a portion of a mounting track that includes an insertion zone suitable for receiving the mount assembly, according to the invention.
Figure 10D:
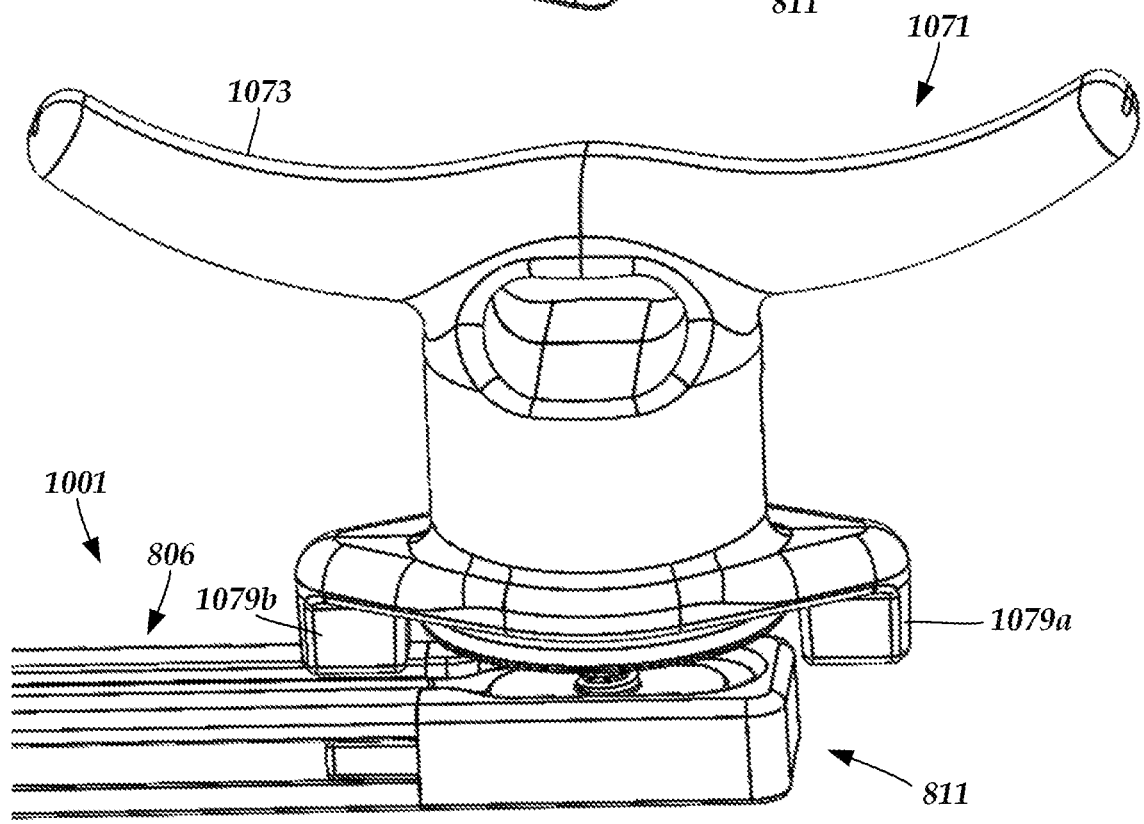
FIG. 10D is a schematic perspective view of one embodiment of the mount assembly and mounting track portion of FIG. 10C with a retention element of the mount assembly fully inserted into the insertion zone and a guide feature of the mount assembly aligned with, and disposed over, the mounting track portion, according to the invention.

FIG. 10C shows, in schematic perspective view, one embodiment of the mount assembly 1071 disposed over the insertion zone 826 of the endpiece 811 of a mounting track 1001. FIG. 10D shows, in schematic perspective view, one embodiment of the mount assembly 1071 partially inserted into the insertion zone 826 of the endpiece 811 of the mounting track 1001. The cleat 1073 is rotated such that the guide features 1079*a*, 1079*b* are aligned with the continuous track, but are not received by the track.

Figure 10E:
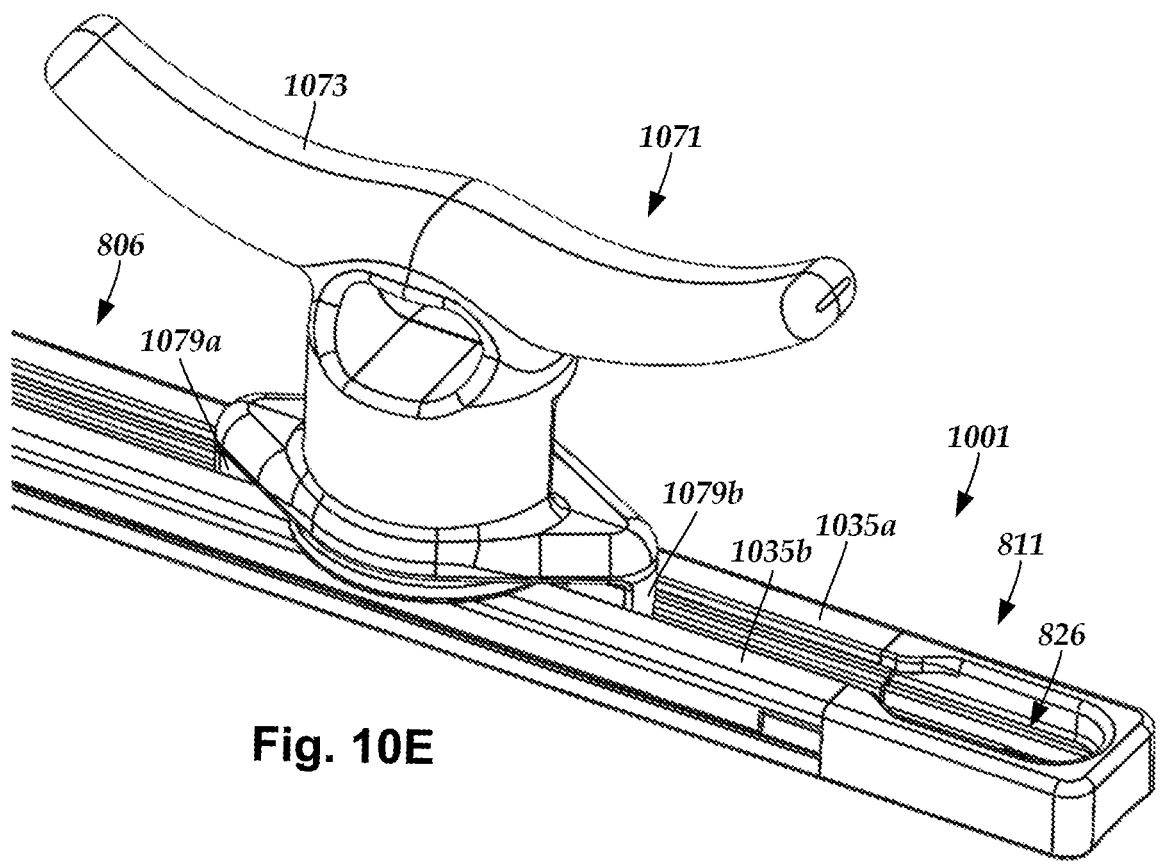
FIG. 10E is a schematic perspective view of one embodiment of the mount assembly and mounting track portion of FIG. 10D with the retention element and the guide features of the mount assembly fully inserted into the mounting track portion, according to the invention.

FIG. 10E shows, in schematic perspective view, one embodiment of the mount assembly 1071 fully inserted into the insertion zone 826 of the endpiece 811 of the mounting track 1001 and slid onto the track section 806. The cleat 1073 is rotated such that the guide features 1079*a*, 1079*b* are aligned with the continuous track and partially inserted between horizontal track beams 1035*a*, 1035*b* of the track section 806 to prevent rotation of the mount assembly 1071 relative to the mounting track 1001.

In at least some embodiments, the mount assembly 471 (e.g., the ball or the cleat) includes a retention mechanism for enabling the mount assembly to removably maintain a particular location, such as a mounting location, along a length of the mounting track. For example, a user may be able to rotate the mount (or a dial or knob disposed on the mount), or flip a lever attached to the mount, or the like, thereby reversibly actuating the retention mechanism to tighten against a portion of the mounting track to maintain the positioning of the mount assembly relative to the mounting track. In at least some embodiments, the mount can be tightened against the track using the retention element. For example, the mount may define a threaded bore that receives a threaded portion of the elongated member, thereby enabling the mount to be rotated relative to the retention element to tighten the mount against the track.

The above specification provides a description of the manufacture and use of the invention. Since many embodiments of the invention can be made without departing from the spirit and scope of the invention, the invention also resides in the claims hereinafter appended.

The invention claimed is:

1. A mounting track, comprising:
   at least two track sections, each of the track sections comprising a track base, two vertical track rails extending opposite each other from the track base, and two horizontal track beams, wherein each of the horizontal track beams extends from a different one of the vertical track rails over the track base toward the other horizontal track beam, wherein the horizontal track beams are laterally spaced apart from each other by a first distance;
   at least two endpieces configured and arranged for attachment to the at least two track sections, each of the endpieces comprising an endpiece base, a vertical endpiece rail extending from the endpiece base and forming a perimeter around a portion of the endpiece base, and two horizontal endpiece beams extending from the vertical endpiece rail over the endpiece base toward the other horizontal endpiece beam, wherein, when attached to the at least two track sections, the track bases and the endpiece bases align, the vertical track rails and the vertical endpiece rails align, and the horizontal track beams and the horizontal endpiece beams align to form a continuous track within which a retention element of a mount assembly can move along the track, wherein the track is closed at two ends by at least the vertical endpiece rails, wherein the at least two endpieces comprise a first endpiece and a second endpiece, wherein the first endpiece is configured and arranged for attachment to a first end of the at least two track sections and the second endpiece is configured and arranged for attachment to a second end of the at least two track sections to form a continuous track extending from the first endpiece to the second endpiece, wherein the at least two track sections comprise a first track section and a second track section disposed between the first endpiece and the second endpiece, wherein the at least two endpieces each comprise an insertion zone where at least two opposing portions of the two horizontal endpiece beams are spaced apart from each other by a second distance that is at least 10% larger than the first distance to facilitate insertion of the retention element of the mount assembly into the track; and an insertion piece disposed between the first track section and the second track section, wherein the insertion piece comprises an insertion-piece base, two vertical insertion-piece rails extending opposite each other from the insertion-piece base, and two horizontal insertion-piece beams, wherein each of the horizontal insertion-piece beams extends from a different one of the vertical insertion-piece rails over the insertion-piece base toward the other horizontal insertion-piece beam, wherein the horizontal insertion-piece beams are laterally spaced apart from each other by the first distance, wherein the at least one insertion piece comprises an insertion-piece insertion zone where at least two opposing portions of the two horizontal insertion-piece beams are spaced apart from each other by a second distance that is at least 10% larger than the first distance to facilitate insertion of the retention element of the mount assembly into the track.

2. The mounting track of claim 1, wherein the first endpiece is attachable to the first track section by corresponding interconnecting features disposed along the first endpiece and the first track section.

3. The mounting track of claim 2, wherein the interconnecting features comprise interconnecting tabs and slits, wherein each of the tabs extends from one of the vertical track rails or vertical endpiece rail and each of the slits is an aperture in one of the vertical track rails or vertical endpiece rail.

4. The mounting track of claim 2, wherein the interconnecting features comprise interconnecting tabs and grooves, wherein each of the tabs extends from one of the vertical track rails or vertical endpiece rail and each of the grooves is formed along an exterior of one of the vertical track rails or vertical endpiece rail.

5. The mounting track of claim 1, wherein the track base of at least one of the first and second track sections defines an alignment channel configured and arranged for facilitating alignment of the mount assembly relative to the mounting track when the retention element of the mount assembly is received by the continuous track.

6. The mounting track of claim 1, wherein the track base of at least one of the first and second track sections defines a fastening aperture configured and arranged for receiving a fastener for fastening the at least one of the first and second track sections to a surface.

7. A track-mounting system, comprising
the mounting track of claim 1; and
the mount assembly coupleable to the mounting track, the mount assembly comprising a mount coupled to the retention element comprising a flange with a smallest lateral dimension that is greater than the first distance and at least one lateral dimension that is less than the second distance, the retention element configured and arranged for insertion into the mounting track along the insertion zones and sliding along the continuous track to position the mount at a mounting location along the continuous track.

8. The track-mounting system of claim 7, wherein the retention element is one of a T-bolt or a T-nut.

9. The track-mounting system of claim 7, wherein the mount is a ball.

10. The track-mounting system of claim 7, wherein the mount is a cleat.

11. The track-mounting system of claim 7, wherein the mounting track defines an alignment channel, and wherein the mount comprises at least one guide feature configured and arranged for insertion into the alignment channel to control orientation of the mount relative to the mounting track.

12. A method of coupling a mount assembly to a mounting track, the method comprising:
providing the mounting track of claim 1;
attaching the first endpiece of the mounting track to the first track section;
inserting the retention element of the mount assembly into the insertion zones of the mounting track to retain the retention element within the mounting track; and
sliding the mount assembly along the mounting track to a mounting location.

13. The method of claim 12, further comprising fastening the mounting track to a surface.

14. A mounting track, comprising:
at least two track sections, each of the track sections comprising a track base, two vertical track rails extending opposite each other from the track base, and two horizontal track beams, wherein each of the horizontal track beams extends from a different one of the vertical track rails over the track base toward the other horizontal track beam, wherein the horizontal track beams are laterally spaced apart from each other by a first distance;

at least two endpieces configured and arranged for attachment to the at least two track sections, each of the endpieces comprising an endpiece base, a vertical endpiece rail extending from the endpiece base and forming a perimeter around a portion of the endpiece base, and two horizontal endpiece beams extending from the vertical endpiece rail over the endpiece base toward the other horizontal endpiece beam, wherein, when attached to the at least two track sections, the track bases and the endpiece bases align, the vertical track rails and the vertical endpiece rails align, and the horizontal track beams and the horizontal endpiece beams align to form a continuous track within which a retention element of a mount assembly can move along the track, wherein the track is closed at two ends by at least the vertical endpiece rails, wherein the at least two endpieces comprise a first endpiece and a second endpiece, wherein the first endpiece is configured and arranged for attachment to a first end of the at least two track sections and the second endpiece is configured and arranged for attachment to a second end of the at least two track sections to form a continuous track extending from the first endpiece to the second endpiece, wherein the at least two track sections comprise a first track section and a second track section disposed between the first endpiece and the second endpiece, wherein the at least two endpieces each comprise an insertion zone where at least two opposing portions of the two horizontal endpiece beams are spaced apart from each other by a second distance that is at least 10% larger than the first distance to facilitate insertion of the retention element of the mount assembly into the track; and an angled-piece disposed between the first track section and the second track section, the angled-piece having a first end and an opposing second end and comprising a bend disposed between the first end and the second end, wherein the angled-piece extends in a first direction between the bend and the first end, and wherein the angled-piece extends in a second direction between the bend and the second end.

15. The mounting track of claim 14, further comprising an insertion piece configured and arranged for attachment between the first track section and the second track section.

16. The mounting track of claim 14, wherein the first direction is perpendicular to the second direction.

17. The mounting track of claim 14, wherein the angled-piece comprises an angled-piece base, two vertical angled-piece rails extending opposite each other from the insertion-piece base, and two horizontal angled-piece beams, wherein each of the horizontal angled-piece beams extends from a different one of the vertical angled-piece rails over the insertion-piece base toward the other horizontal angled-piece beam, wherein the horizontal angled-piece beams are laterally spaced apart from each other by the first distance, wherein the angled-piece comprises a multi-directional insertion zone where at least two opposing portions of the two horizontal angled-piece beams are spaced apart from each other by a second distance that is at least 10% larger than the first distance to facilitate insertion of the retention element of the mount assembly into the track, and wherein the multi-directional insertion zone extends along each of the first direction and the second direction.

18. The mounting track of claim 14, wherein the first endpiece is attachable to the first track section by corresponding interconnecting features disposed along the first endpiece and the first track section.

19. The mounting track of claim 18, wherein the interconnecting features comprise interconnecting tabs and slits, wherein each of the tabs extends from one of the vertical track rails or vertical endpiece rail and each of the slits is an aperture in one of the vertical track rails or vertical endpiece rail.

20. A track-mounting system, comprising
the mounting track of claim 14; and
the mount assembly coupleable to the mounting track, the mount assembly comprising a mount coupled to the retention element comprising a flange with a smallest lateral dimension that is greater than the first distance and at least one lateral dimension that is less than the second distance, the retention element configured and arranged for insertion into the mounting track along the insertion zones and sliding along the continuous track to position the mount at a mounting location along the continuous track.

* * * * *